(12) United States Patent
Heo et al.

(10) Patent No.: US 11,429,295 B2
(45) Date of Patent: Aug. 30, 2022

(54) STORAGE DEVICE STORING DATA BASED ON KEY-VALUE AND OPERATING METHOD OF THE SAME

(71) Applicant: SAMSUNG ELECTRONICS CO., LTD., Suwon-si (KR)

(72) Inventors: Wan Heo, Suwon-si (KR); Satish Kumar, Suwon-si (KR); Hwang Lee, Seoul (KR); Byounggeun Kim, Seoul (KR); Chansoo Kim, Seoul (KR); Sangyoon Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/037,993

(22) Filed: Sep. 30, 2020

(65) Prior Publication Data
US 2021/0165589 A1 Jun. 3, 2021

(30) Foreign Application Priority Data
Dec. 2, 2019 (KR) .................. 10-2019-0158449

(51) Int. Cl.
*G06F 3/06* (2006.01)
(52) U.S. Cl.
CPC .......... *G06F 3/0638* (2013.01); *G06F 3/0604* (2013.01); *G06F 3/0656* (2013.01); *G06F 3/0679* (2013.01)
(58) Field of Classification Search
CPC .... G06F 3/0604; G06F 3/0679; G06F 3/0656; G06F 3/0608; G06F 3/061; G06F 3/0638; G06F 3/0643; G06F 3/0641; G06F 3/0658

USPC ........................................................ 711/103
See application file for complete search history.

(56) References Cited

U.S. PATENT DOCUMENTS

| 8,849,761 B2 | 9/2014 | Prahlad et al. |
| 9,311,252 B2 | 4/2016 | Fong et al. |
| 2004/0143644 A1* | 7/2004 | Berton .............. G06F 16/24542 709/217 |

(Continued)

FOREIGN PATENT DOCUMENTS

CN 107038206 8/2017

OTHER PUBLICATIONS

Chan, et al., "HashKV: Enabling Efficient Updates in KV Storage via Hashing", Proceedings of the 2018 USENIX Annual Technical Conference (USENIX ATC '18), Jul. 11-13, 2018, Boston, MA, USA, 14 pages.

(Continued)

*Primary Examiner* — Hashem Farrokh
(74) *Attorney, Agent, or Firm* — F. Chau & Associates, LLC

(57) ABSTRACT

Provided are a storage device storing data on the basis of key-value and an operating method thereof, wherein the storage device separates and manages a plurality of keys and a plurality of values respectively corresponding to the plurality of keys, and includes a first controller processing a first key and a first value corresponding to the first key, a second controller processing a second key and a second value corresponding to the second key, and a nonvolatile memory storing the first key, the second key, the first value, and the second value, wherein the first key includes information about the second controller regarding a processing core for the second value processed next to the first value.

20 Claims, 18 Drawing Sheets

(56) References Cited

U.S. PATENT DOCUMENTS

| | | | |
|---|---|---|---|
| 2012/0330908 A1* | 12/2012 | Stowe | G06F 16/248 707/693 |
| 2014/0188870 A1 | 7/2014 | Borthakur et al. | |
| 2014/0279901 A1 | 9/2014 | Agrawal et al. | |
| 2016/0179865 A1 | 6/2016 | Bortnikov et al. | |
| 2016/0188690 A1 | 6/2016 | Tan et al. | |
| 2016/0232169 A1 | 8/2016 | Archak et al. | |
| 2018/0107525 A1* | 4/2018 | Govindaraju | G06F 8/71 |

OTHER PUBLICATIONS

Lu, et al., "WiscKey: Separating Keys from Values in SSD-Conscous Storage", ACM Trans. Storage 13, 1, Article 5 (Mar. 2017), University of Wisconsin, Madison, pp. 5:1-5:28.

Lu, et al., "WiscKey: Separating Keys from Values in SSD-Conscous Storage", Proceedings of the 14th USENIX Conference on File and Storage Technologies (FAST '16), Feb. 22-25, 2016, Santa Clara, CA, USA, 17 pages.

\* cited by examiner

FIG. 8A

| FIRST CONTROLLER (C0) (110) | KEY0 (C1) | KEY3 (C1) | KEY6 (C1) |
|---|---|---|---|
| | VAL0 | VAL3 | VAL6 |

| SECOND CONTROLLER (C1) (130) | KEY1 (C2) | KEY4 (C2) | KEY7 (C2) |
|---|---|---|---|
| | VAL1 | VAL4 | VAL7 |

| THIRD CONTROLLER (C2) (160) | KEY2 (C0) | KEY5 (C0) | KEY8 (C0) |
|---|---|---|---|
| | VAL2 | VAL5 | VAL8 |

FIG. 8B

| FIRST CONTROLLER (C0) (110) | KEY0 (C1) | KEY3 (C2) | KEY6 (C1) |
|---|---|---|---|
| | VAL0 | VAL3 | VAL6 |

| SECOND CONTROLLER (C1) (130) | KEY1 (C2) | KEY5 (C0) | KEY7 (C2) |
|---|---|---|---|
| | VAL1 | VAL5 | VAL7 |

| THIRD CONTROLLER (C2) (160) | KEY2 (C0) | KEY4 (C1) | KEY8 |
|---|---|---|---|
| | VAL2 | VAL4 | VAL8 |

FIG. 8C

| FIRST CONTROLLER (C0) (110) | KEY0 | KEY1 | KEY2 (C1) |
|---|---|---|---|
| | VAL0 | VAL1 | VAL2 |

| SECOND CONTROLLER (C1) (130) | KEY3 | KEY4 | KEY5 (C2) |
|---|---|---|---|
| | VAL3 | VAL4 | VAL5 |

| THIRD CONTROLLER (C2) (160) | KEY6 | KEY7 | KEY8 (C0) |
|---|---|---|---|
| | VAL6 | VAL7 | VAL8 |

FIG. 8D

| FIRST CONTROLLER (C0) (110) | KEY0 | KEY3 | KEY6 |
|---|---|---|---|
| | VAL0 (C1) | VAL3 (C1) | VAL6 (C1) |

| SECOND CONTROLLER (C1) (130) | KEY1 | KEY4 | KEY7 |
|---|---|---|---|
| | VAL1 (C2) | VAL4 (C2) | VAL7 (C2) |

| THIRD CONTROLLER (C2) (160) | KEY2 | KEY5 | KEY8 |
|---|---|---|---|
| | VAL2 (C0) | VAL5 (C0) | VAL8 (C0) |

STORAGE DEVICE STORING DATA BASED ON KEY-VALUE AND OPERATING METHOD OF THE SAME

CROSS-REFERENCE

This application claims priority under 35 USC § 119 to Korean Patent Application No. 10-2019-0158449, filed on Dec. 2, 2019, in the Korean Intellectual Property Office, the disclosure of which is incorporated by reference herein in its entirety.

FIELD

The inventive concept relates to a storage device and an operating method thereof, and more particularly, to a storage device storing data on the basis of key-value.

DISCUSSION OF RELATED ART

Electronic devices may store data and operate on the basis of the stored data. For this, electronic devices may include storage devices or storage systems to store data or may communicate with external storage devices or storage systems to store or read data.

Storage devices may be classified in various ways. For example, storage devices may be classified into nonvolatile memory-based storages and volatile memory-based storages. The nonvolatile memory-based storages may not lose data even when power is not supplied thereto. If the supply of power is interrupted, data stored in the volatile memory-based storages may be lost, but the volatile memory-based storages may operate faster than the nonvolatile memory-based storages.

For example, storage devices may be classified into block storages, file storages, and object storages. The block storages may manage data on the basis of physical locations, and the file storages may manage data on the basis of logical sequences. The object storages may manage data on the basis of unique identifiers. While the block storages and the file storages are useful when there is a large amount of text data, the object storages may be efficient alternatives when there is a large amount of unstructured data such as sound data, video data, and the like. Object storage stores data and metadata separately, where the metadata may be stored in encapsulated, database, or key-value form. An example of object storage includes a key-value storage storing data values on the basis of associated keys.

SUMMARY

The inventive concept provides a storage device that efficiently includes, in a key, processor information processing a next key, and a storage system including the storage device.

According to an aspect of the inventive concept, there is provided a storage device separating and managing a plurality of keys and a plurality of datasets or values respectively corresponding to the plurality of keys, the storage device including a first controller configured to process a first key and a first value corresponding to the first key, a second controller configured to process a second key and a second value corresponding to the second key, and a nonvolatile memory configured to store the first key, the second key, the first value, and the second value, wherein the first key includes information about the second controller regarding a processing core for the second value processed next to the first value.

According to another aspect of the inventive concept, a storage device includes: a first controller assigned to process a first key-value pair including a first key and a first value corresponding to the first key; a second controller assigned to process a second key-value pair including a second key and a second value corresponding to the second key; and a nonvolatile memory configured to store the first value and the second value in at least one first area of the nonvolatile memory, and to store the first key and the second key in at least one second area of the nonvolatile memory, wherein at least one of the first key-value pair or the second key-value pair comprises information about which one of the second controller or the first controller is assigned to process a next key-value pair to the at least one of the first key-value pair or the second key-value pair, respectively.

According to an aspect of the inventive concept, there is provided an operating method of a storage system, including receiving data, extracting a first key and a first value corresponding to the first key from the received data, extracting a second key and a second value corresponding to the second key from the received data, including, in the first key, first processing core information about a processing core for the second value processed next to the first value, and storing the first key including the first processing core information in a nonvolatile memory.

According to another aspect of the inventive concept, an operating method of a storage system includes: receiving data; extracting a first key-value pair including a first key and a first value corresponding to the first key from the received data; extracting a second key-value pair including a second key and a second value corresponding to the second key from the received data; including, in at least one of the first key-value pair or the second key-value pair, first processing core information about a processing core for a key-value pair processed next to the at least one first key-value pair or the second key-value pair; and storing the at least one of the first key-value pair or the second key-value pair including the first processing core information in a nonvolatile memory According to an aspect of the inventive concept, there is provided a storage system including a host configured to transmit data including a plurality of keys and a plurality of values corresponding to the plurality of keys, a first storage device configured to process a first key of the plurality of keys and a first value corresponding to the first key, and a second storage device configured to process a second key of the plurality of keys and a second value corresponding to the second key, wherein the first key includes information about the second storage device regarding a processing core for the second value processed next to the first value.

According to another aspect of the inventive concept, a storage system includes: a host configured to transmit data comprising a plurality of key-value pairs including a plurality of keys and a plurality of values corresponding to the plurality of keys, respectively; a first storage device configured to process a first key-value pair including a first key of the plurality of keys and a first value corresponding to the first key; and a second storage device configured to process a second key-value pair including a second key of the plurality of keys and a second value corresponding to the second key, wherein at least one of the first key-value pair or the second key-value pair comprises information about at least one of the second storage device or the first storage device regarding a processing core for a next key-value pair processed next to the at least one of the first key-value pair or the second key-value pair.

BRIEF DESCRIPTION OF THE DRAWINGS

Embodiments of the inventive concept will be more clearly understood from the following detailed description taken in conjunction with the accompanying drawings, in which:

FIGS. 8A through 8D are tabular diagrams illustrating key-value pairs according to an exemplary embodiment;

DETAILED DESCRIPTION

Figure 1:
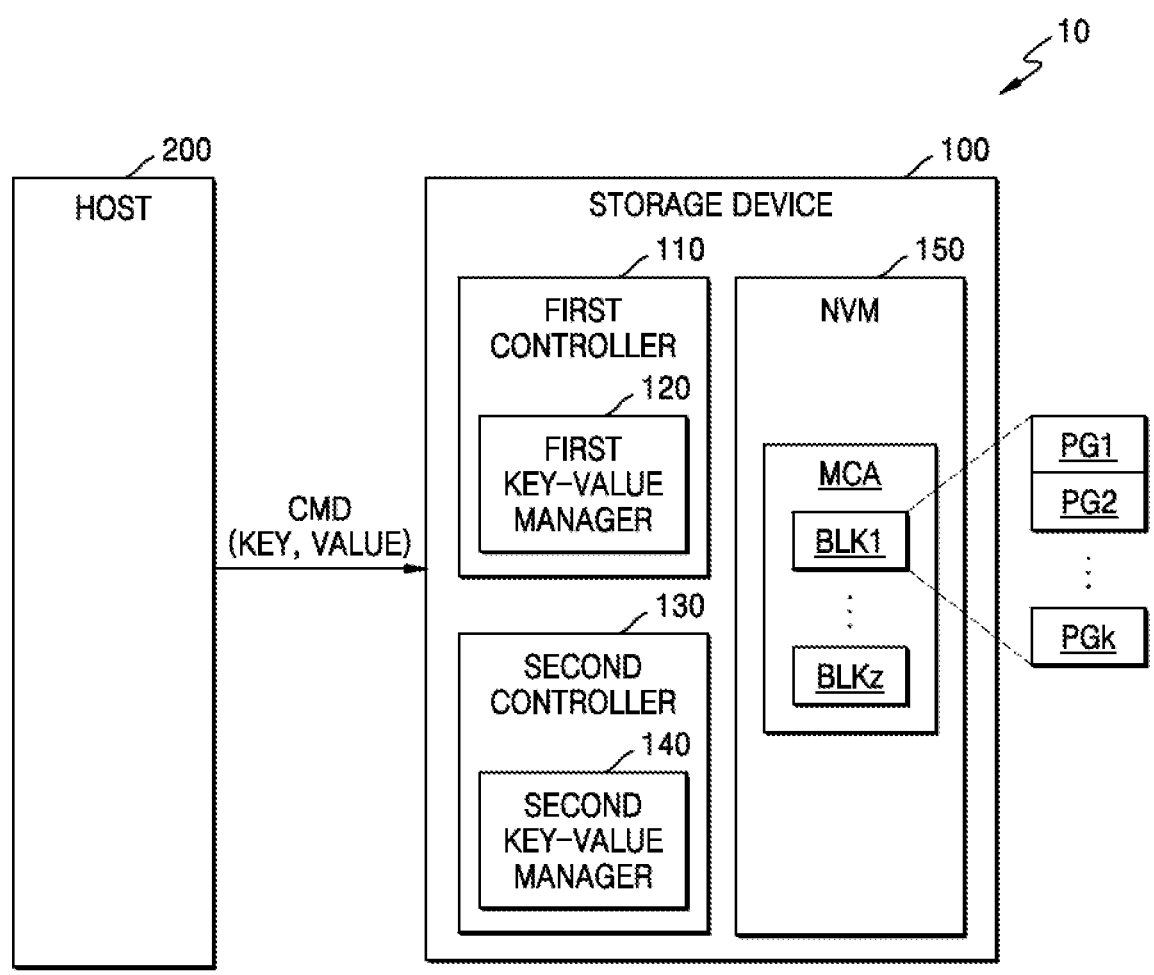
FIG. 1 is a schematic block diagram illustrating a storage system according to an exemplary embodiment.

FIG. 1 illustrates a storage system according to an exemplary embodiment.

Referring to FIG. 1, a storage system 10 may include a storage device 100 and a host 200. The storage device 100 may include a first controller 110, a second controller 130, and a nonvolatile memory (NVM) 150. The storage device 100 may be a multi-core system having a plurality of controllers, such as the first and second controllers 110 and 130, without limitation. In an example, the storage device 100 may be constituted as a dual-core system having two processors, a quad-core system having four processors, a hexa-core system having six processors, an octa-core system having eight processors, or the like, but is not limited thereto. Also, the first controller 110 and the second controller 130 may be driven by different processors, or may refer to different processors.

The host 200 may communicate with the storage device 100 through various types of interfaces. For example, the host 200 may be embodied as an application processor (AP) or a System-On-a-Chip (SoC).

In an embodiment, the storage device 100 may be a key-value storage device or a key-value store, such as, for example, a key-value solid state drive (SSD). The key-value storage device is a device that quickly and efficiently processes data using a key-value pair. Here, the "key-value pair" is a pair of a unique key and a value that is data corresponding to the key, and may refer to "tuple" or "key-value tuple". In the key-value pair, the key may be represented by any string such as a file name, a uniform resource identifier (URI), a hash, or the like, and the value may be any type of data such as, for example, an image, a blob or user-liked file, or a document. Here, sizes of the key and the value vary, for example, the size of the value may change according to data included in the value.

Hereinafter, a description will be given of an embodiment in which the storage device 100 is a key-value storage device, and herein, the storage device 100 may substantially mean the same as a key-value storage device or a key-value store. However, the storage device 100 is not limited to the key-value storage device and may be applied to any object cache system or object storage system that manages data in units of objects, such as, for example, an encapsulated store or database. Therefore, the storage device 100 may manage data in units of objects as key-value pairs for a key-value embodiment, or in any manner other than the key-value pair, such as but not limited to tuples.

The host 200 may transmit, to the storage device 100, a command CMD for writing data including at least one key-value pair, for example, and a write request or a put command. The storage device 100 may write at least one value VALUE to the nonvolatile memory 150 in response to the command CMD. In an embodiment, the host 200 may transmit, to the storage device 100, the command CMD including at least one key KEY, for example, a read request or a get command, and the storage device 100 may read the at least one value VALUE corresponding to the at least one key KEY, respectively, from the nonvolatile memory 150 in response to the command CMD.

The first controller 110 may control the nonvolatile memory 150 to write the value VALUE to the nonvolatile memory 150 in response to the write request from the host 200 or read the value VALUE stored in the nonvolatile memory 150 in response to the read request from the host 200. The first controller 110 may include a first key-value manager 120.

The first key-value manager 120 may receive the key-value pair included in the command CMD and separate the key KEY and the value VALUE included in the key-value pair. The key-value manager 120 may extract a key set or plurality of keys KEY included in the key-value pair and store the plurality of keys KEY in a data buffer, for example. The first key-value manager 120 may extract a plurality of values VALUE included in the key-value pair and store the plurality of values VALUE in the data buffer.

When a plurality of keys KEY of a preset number or a preset amount of data values VALUE are stored in the data buffer, the first key-value manager 120 may store the plurality of stored keys KEY as a key stream in the nonvolatile memory 150. When a plurality of values VALUE of a preset number or a preset amount of data are stored in the data buffer, the first key-value manager 120 may store the plurality of stored values VALUE as a value stream in the nonvolatile memory 150. In an embodiment, the value stream and the key stream may be stored in different areas of the nonvolatile memory 150.

In an embodiment, the value VALUE may have a larger amount of data than the key KEY, and the first key-value manager 120 may separate the key-value pair and manage the key KEY and the value VALUE independently of each other to reduce the amount of input/output data for the nonvolatile memory 150, thereby increasing a data processing capability for the key-value pair.

As in the first controller 110, the second controller 130 may control the nonvolatile memory 150 to write the value VALUE to the nonvolatile memory 150 in response to the write response from the host 200 or read the value VALUE stored in the nonvolatile memory 150 in response to the read request from the host 200. In an embodiment, the second controller 130 may process a second key of the keys KEY different from a first key of the keys KEY processed by the first controller 110. In an example, a plurality of keys KEY may include a first key set and a second key set, the first key set and values corresponding thereto may be processed by the first controller 110, and the second key set and values corresponding thereto may be processed by the second controller 130.

The second controller 130 may include a second key-value manager 140. In similar fashion to the first key-value manager 120, the second key-value manager 140 may perform the operations described above on the second key set allocated to the second controller 130. Details of the second key-value manager 140 are like those disclosed in the above description of the first key-value manager 120, and thus duplicate description thereof may be omitted herein.

The nonvolatile memory 150 may include a memory cell array MCA, the memory cell array MCA may include memory blocks BLK1 through BLKz, and the memory block BLK1 may include a plurality of pages PG1 through PGk. Here, z and k may be respectively positive integers and may be variously changed according to embodiments. For example, a memory block may be a unit of erase, and a page may be a unit of write and read. In some embodiments, the memory cell array MCA may include a plurality of planes, a plurality of dies, or a plurality of chips. In an embodiment, the nonvolatile memory 150 may include a flash memory device, such as, for example, a NAND flash memory device. However, the inventive concept is not limited thereto, and the nonvolatile memory 150 may include a resistive memory device such as resistive RAM (ReRAM), phase change RAM (PRAM), magnetic RAM (MRAM), and/or the like.

The storage system 10 may be embodied as, for example, a personal computer (PC), a data server, a network-coupled storage, an Internet of Things (IoT) device, or a portable electronic device. The portable electronic device may be a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

In some embodiments, the storage device 100 may be an internal memory embedded in an electronic device. For example, the storage device 100 may be a solid-state drive (SSD), an embedded universal flash storage (UFS) memory device, an embedded multi-media card (eMMC), or the like. In some embodiments, the storage device 100 may be an external memory removable from an electronic device. For example, the storage device 100 may be a UFS memory card, compact flash (CF) card, secure digital (SD) card, micro secure digital (Micro-SD) card, mini secure digital (Mini-SD) card, extreme digital (xD) card, or a memory stick.

In the exemplary embodiment of FIG. 1, two controllers, 110 and 130, are included in the storage device 100, but the inventive concept is not limited thereto. For example, alternate embodiments may have two or more controllers included in the storage device 100. Moreover, the two or more controllers need not share one nonvolatile memory 150, but may be control a plurality of nonvolatile memories.

Figure 2:
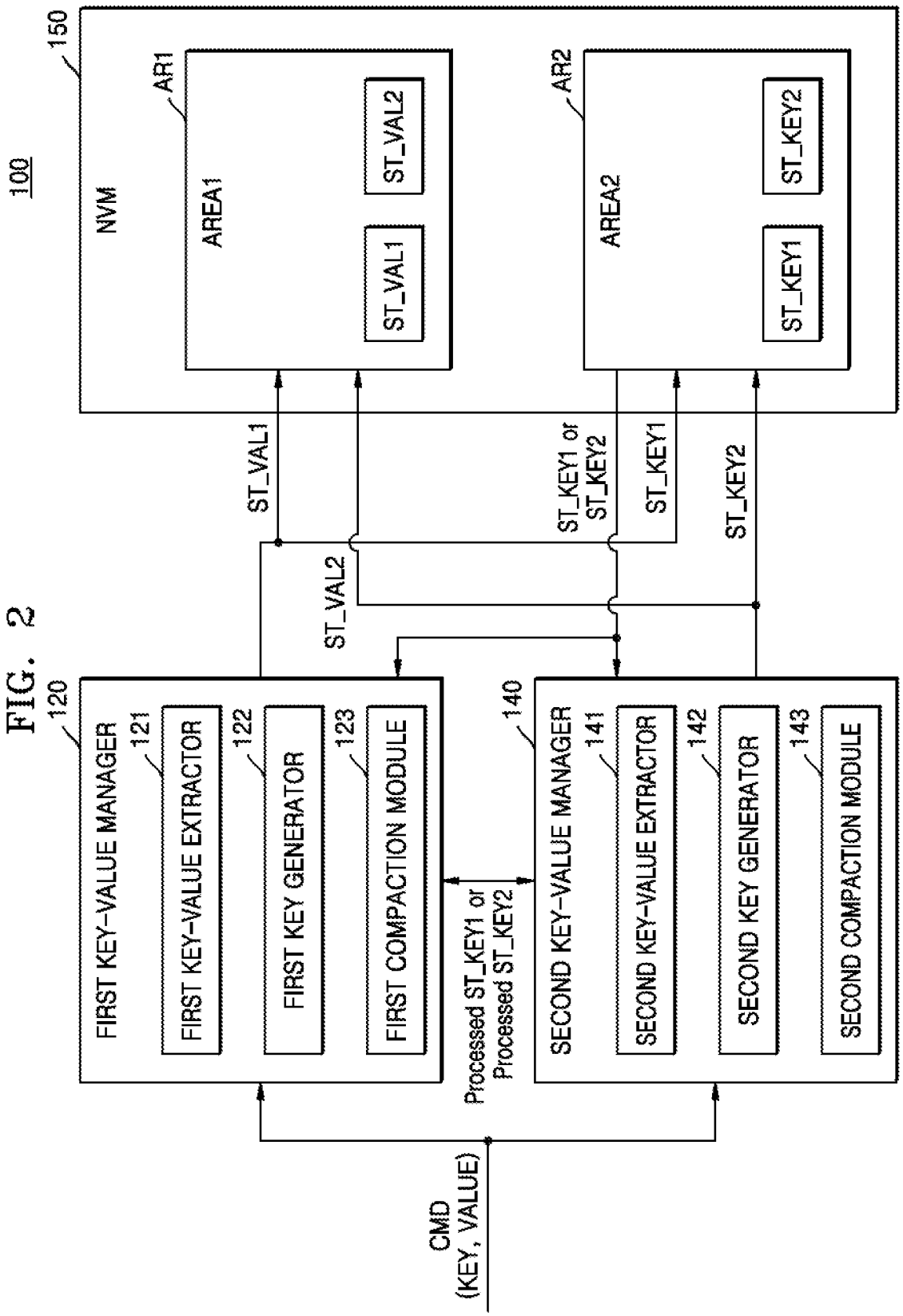
FIG. 2 is a schematic block diagram illustrating a storage device according to an exemplary embodiment.

FIG. 2 illustrates a storage device according to an exemplary embodiment. Duplicate descriptions in FIG. 2 that have already been given above with respect to FIG. 1 may be omitted herein.

Referring to FIG. 2, a storage device 100 may include a first key-value manager 120, a second key-value manager 140, and a nonvolatile memory (NVM) 150.

The first key-value manager 120 may include a first key-value extractor 121, a first key generator 122, and a first compaction module 123. The first key-value extractor 121 may extract a first key and a first value allocated to a first controller (110 of FIG. 1), from keys KEY and values VALUE included in a command CMD. In an example, the first key-value extractor 121 may store the extracted first key in a key buffer of a data buffer and store the extracted first value in a value buffer of the data buffer.

The first key generator 122 may add, to the first key extracted by the first key-value extractor 121, information about a controller processing a next key or value after the first key. In an example, the command CMD may include a second key and a second value corresponding thereto after the first key and the first value corresponding thereto in a data sequence, and the second key and the second value may be processed by a second controller (130 of FIG. 1). The first key generator 122 may add, to the first key, information about the second controller processing the second value.

The storage device 100 according to the inventive concept may add, to keys KEY, processing core information about a controller processing a key or a value existing after each of the keys KEY. When processing a key from keys KEY and then processing a next key from keys KEY, the storage device 100 may identify a processing subject for the next key from keys KEY on the basis of processing core information included in the previously processed key from keys KEY. Therefore, in a multi-core system in which data is processed by a plurality of controllers, processing for a plurality of keys with continuity may be efficiently performed. As used herein, the term "next key" may refer to a key corresponding to a next value in a data sequence in values having continuity.

The first key-value extractor 121 may generate a first key stream ST_KEY1 by merging a plurality of keys to which processing core information is added, and generate a first value stream ST_VAL1 by merging a plurality of corresponding values. The first key-value extractor 121 may store the first value stream ST_VAL1 in a first area AR1 of the NVM 150, and store the first key stream ST_KEY1 in a second area AR2 of the NVM 150.

The first compaction module 123 may perform a compaction operation on at least one key stream ST_KEY1 or ST_KEY2 stored in the second area AR2. As used herein, the compaction operation may refer to an operation of generating a new key stream by deleting a key KEY corresponding to an invalid value VALUE stored in the nonvolatile memory 150. In an example, the compaction operation may refer to an operation for compressing data in a log structured merge (LSM) tree-based data structure.

The first compaction module 123 may read at least one key stream ST_KEY1 or ST_KEY2 stored in the second area AR2 and distinguish an invalid key. In an example, the invalid key may be a key from keys KEY corresponding to a value from values VALUE that receives a delete command from a host. The first compaction module 123 may generate a new key stream using merely a valid key from keys KEY included in the at least one key stream ST_KEY1 or ST_KEY2. The first compaction module 123 may write the generated new key stream in the second area AR2 of the nonvolatile memory 150.

According to an embodiment, the first compaction module 123 may identify a processing subject of a next key on the basis of processing core information of keys included in the first key stream ST_KEY1. In an example, a second key stream ST_KEY2 may be located after the first key stream ST_KEY1 in a data sequence. The first compaction module 123 may identify that processing subjects of the second key stream ST_KEY2 located next are the second controller and the second key-value manager 140 included therein, on the basis of the processing core information included in the first key stream ST_KEY1, and transmit the processed first key stream ST_KEY1 to the second key-value manager 140 to enable the second key-value manager 140 to perform a compaction operation.

The second key-value manager 140 may include a second key-value extractor 141, a second key generator 142, and a second compaction module 143. The second key-value manager 140 is different from the first key-value manager 120 in terms of a controller including a same or corresponding processor, but may perform a similar operation, and thus duplicate description thereof may be omitted herein.

According to an embodiment, when a multi-core system performs a compaction operation, the storage device 100 may identify a processing subject of a next key on the basis of processing core information included in a preceding key, and the compaction operation may be efficiently performed by a plurality of controllers.

An embodiment in which two key-value managers, 120 and 140, are included in the storage device 100 is illustrated in FIG. 2, but this is merely an embodiment, and thus the spirit of the inventive concept may be applied even in a case where more than two key-value managers are included in the storage device 100. Also, an embodiment in which a plurality of key-value managers 120 and 140 share one nonvolatile memory 150 is illustrated in FIG. 2, but this is merely an embodiment, and thus it will be understood that the spirit of the inventive concept may be applied even in a case where the plurality of key-value managers are connected to a respective plurality of nonvolatile memories.

Figure 3:
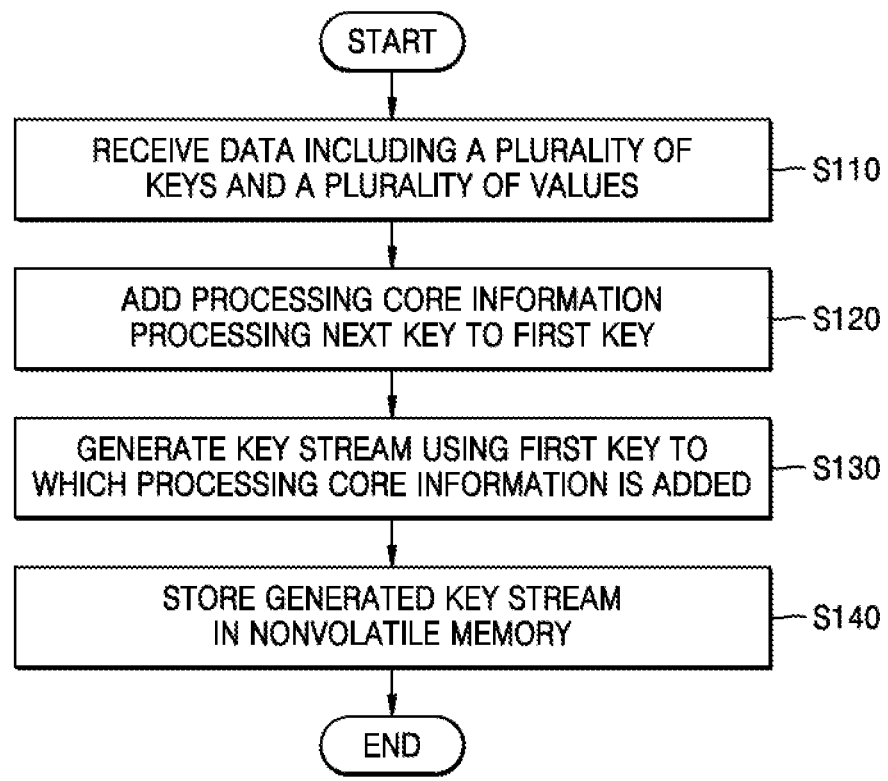
FIG. 3 is a flowchart diagram illustrating an operating method of a storage device, according to an exemplary embodiment.

FIG. 3 illustrates an operating method of a storage device, according to an exemplary embodiment. Descriptions in FIG. 3 that have already been given above with respect to FIGS. 1 and 2 may be omitted herein.

Referring to FIGS. 2 and 3, in operation S110, the storage device 100 may receive data including a plurality of keys and a plurality of values. In operation S120, the storage device 100 may add, to a first key, processing core information regarding the processing of a next key. In an example, the processing core information may be indicative of any one of a plurality of controllers that is processing the next key.

In operation S130, the storage device 100 may generate a key stream using the first key to which the processing core information is added. In an example, the storage device 100 may generate the key stream by merging other keys with the first key to which the processing core information is added.

In operation S140, the storage device 100 may store the generated key stream in the nonvolatile memory 150. In an embodiment, the storage device 100 may store the key stream and the plurality of values in different areas, such as, for example, different blocks but not limited thereto, in the nonvolatile memory 150.

Figure 4:
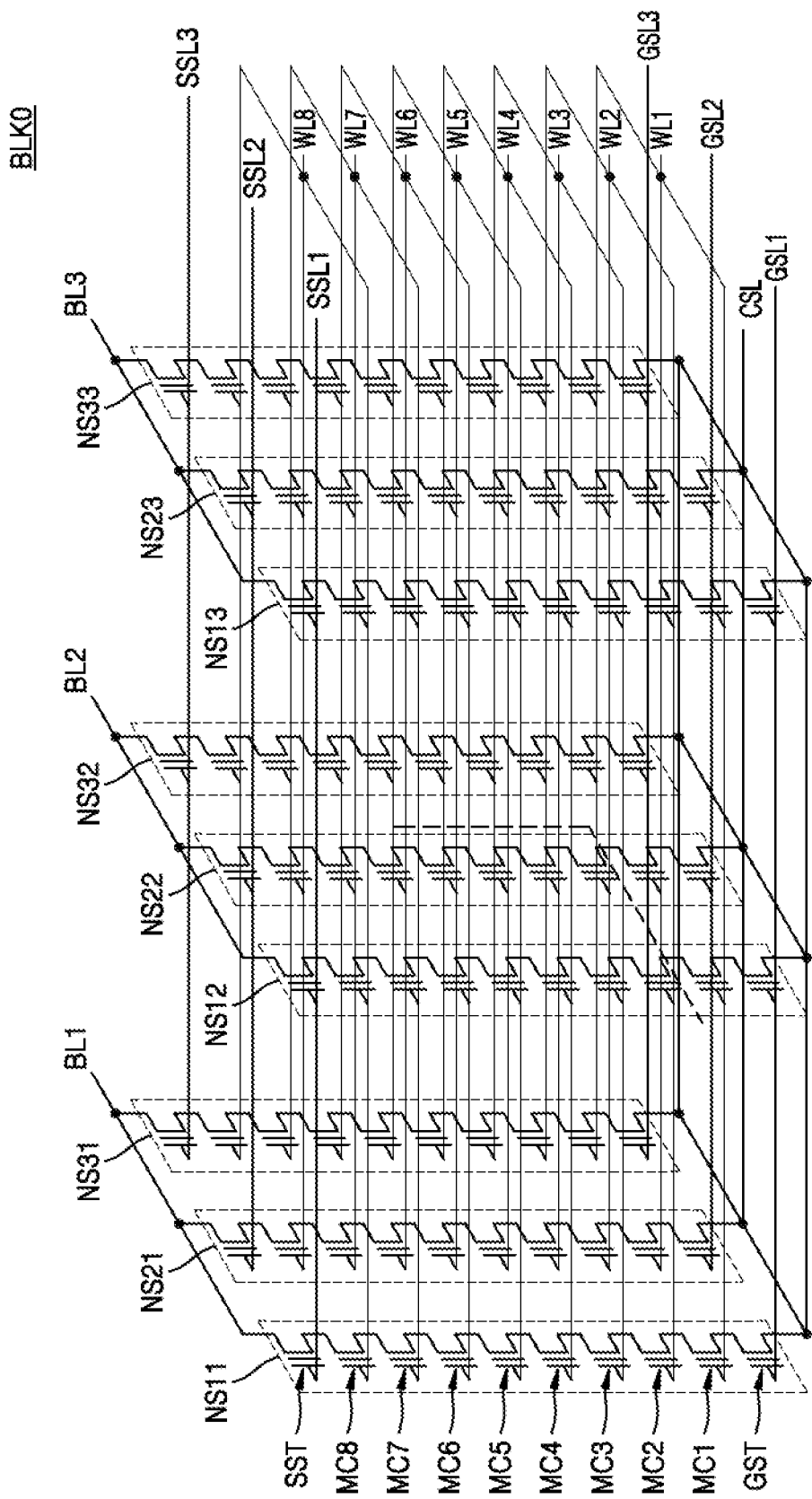
FIG. 4 is a circuit diagram illustrating a memory block included in a memory cell array, according to an exemplary embodiment.

FIG. 4 illustrates a memory block included in a memory cell array, according to an exemplary embodiment.

Referring to FIG. 4, a memory cell array, such as the memory cell array MCA of FIG. 1, without limitation, may be a memory cell array of a vertical NAND flash memory and may include a plurality of memory blocks. Each memory block, such as BLK0, may include a plurality of NAND cell strings NS11 through NS13, NS21 through NS23, and NS31 through NS33, a plurality of wordlines WL1 through WL8, a plurality of bitlines BL1 through BL3, a plurality of ground select lines GSL1 through GSL3, a plurality of cell string select lines SSL1 through SSL3, and a common source line CSL. Here, the number of NAND cell strings, the number of wordlines, the number of bitlines, the number of ground select lines, and the number of cell string select lines may be variously changed according to embodiments.

The NAND cell strings NS11, NS21, and NS31 are provided between the first bitline BL1 and the common source line CSL, the NAND cell strings NS12, NS22, and NS32 are provided between the second bitline BL2 and the common source line CSL, and the NAND cell strings NS13, NS23, and NS33 are provided between the third bitline BL3 and the common source line CSL. Each NAND cell string, such as the NAND cell string NS11, may include a cell string select transistor SST having its gate connected to a corresponding cell string select line, a ground select transistor GST having it gate connected to a corresponding ground select line, and a plurality of memory cells MC1 through MC8 connected therebetween, that are connected to one another in series.

Cell strings that are commonly connected to one bitline constitute one column. For example, the NAND cell strings NS11, NS21, and NS31 commonly connected to the first bitline BL1 may correspond to a first column, the NAND cell strings NS12, NS22, and NS32 commonly connected to the second bitline BL2 may correspond to a second column, and the NAND cell strings NS13, NS23, and NS33 commonly connected to the third bitline BL3 may correspond to a third column.

Cell strings that are connected to one cell string select line constitute one row. For example, the NAND cell strings NS11, NS12, and NS13 connected to the first cell string select line SSL1 may correspond to a first row, the NAND cell strings NS21, NS22, and NS23 connected to the second cell string select line SSL2 may correspond to a second row, and the NAND cell strings NS31, NS32, and NS33 connected to the third cell string select line SSL3 may correspond to a third row.

The cell string select transistors SST are connected to the corresponding cell string select lines SSL1 through SSL3, and each define a cell string of vertically arranged memory cells. The plurality of memory cells MC1 through MC8 are respectively connected to the corresponding wordlines WL1 through WL8. The ground select transistors GST are connected to the corresponding ground select lines GSL1 through GSL3. The cell string select transistors SST are connected to the corresponding bitlines BL1 through BL3, and the ground select transistors GST are connected to the common source line CSL.

Wordlines, such as the first wordline WL1, having the same height are commonly connected to one another, the cell string select lines SSL1 through SSL3 are separated from one another, and the ground select lines GSL1 through GSL3 are also separated from one another. For example, when programming memory cells connected to the first wordline WL1 and belonging to the NAND cell strings NS11, NS12, and NS13, the first wordline WL1 and the first cell string select line SSL1 are selected. The ground select lines GSL1 through GSL3 may also be commonly connected to one another, but aren't limited thereto.

A storage device according to an embodiment may store a key and a value in different areas of a memory cell array. In an example, the key may be stored in a first horizontally arranged page of memory cells connected to the first wordline WL1 of the memory block BLK0, and the value may be stored in a second horizontally arranged page of memory cells connected to the fourth wordline WL4 of the memory block BLK0.

Figure 5:
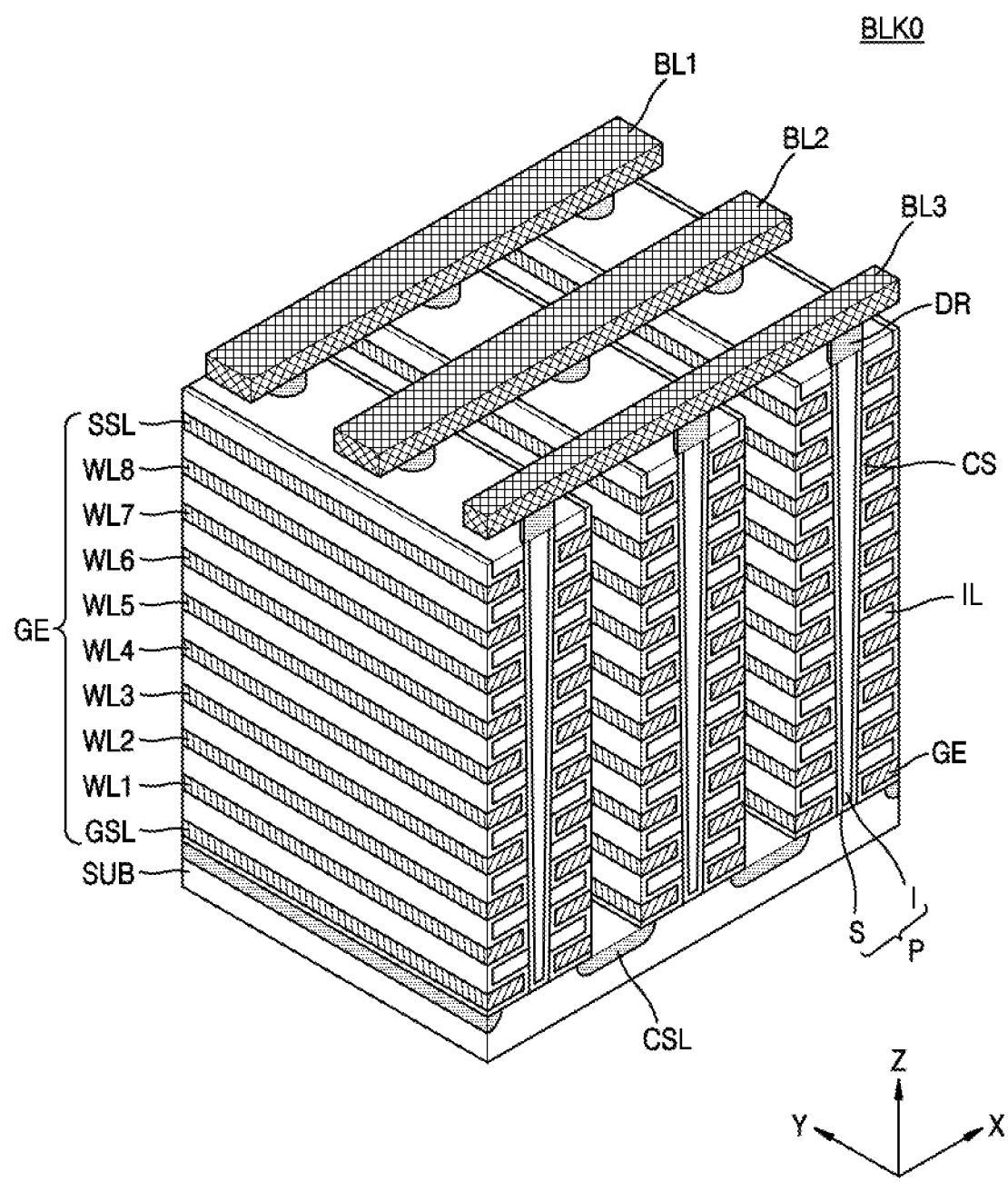
FIG. 5 is a perspective diagram illustrating the memory block of FIG. 4.

FIG. 5 illustrates an exemplary structure of the memory block of FIG. 4.

Referring to FIG. 5, each memory block BLK0 included in a memory cell array, such as the memory cell array MCA of FIG. 1, is formed in a direction substantially perpendicular to a substrate SUB, such as the Z direction of FIG. 5. In FIG. 5, the memory block BLK0 is illustrated as including two select lines GSL and SSL, eight wordlines WL1 through WL8, and three bitlines BL1 through BL3, but may substantially include greater or fewer lines than these lines.

The substrate SUB has a first conductivity type, such as p-type, and common source lines CSL that are spaced in first directions, such as the X direction of FIG. 5, and extend in a second direction, such as the Y direction of FIG. 5, and are doped with impurities of a second conductivity type, such as n-type. In an area of the substrate SUB between two adjacent common source lines CSL, a plurality of insulating layers IL extending in the second direction are sequentially provided in a third direction, such as the Z direction of FIG. 5, and are spaced apart from each other by a particular distance in the third direction. For example, the plurality of insulating layers IL may include an insulation material such as silicon oxide.

In the area of the substrate SUB between the two adjacent common source lines CSL, a plurality of pillars P that are sequentially arranged in the second direction and penetrate the plurality of insulating layers IL in the third direction are provided. For example, the plurality of pillars P may contact the substrate SUB through the plurality of insulating layers IL. In detail, a surface layer S of each pillar P may include a silicon material having a first type and function as a channel area. An internal layer 1 of each pillar P may include an insulation material such as silicon oxide or an air gap.

In the area between the two adjacent common source lines CSL, a charge storage layer CS is provided along exposed surfaces of the insulating layers IL, the pillars P, and the substrate SUB. The charge storage layer CS may include a gate insulating layer or "tunneling insulating layer", a charge trap layer, and a blocking insulating layer. For example, the charge storage layer CS may have an oxide-nitride-oxide (ONO) structure. Also, in the area between the two adjacent common source lines CSL, gate electrodes GE, such as the select lines GSL and SSL and the wordlines WL1 through WL8, are provided on an exposed surface of the charge storage layer CS.

Drains or drain contacts DR are respectively provided on the plurality of pillars P. For example, the drains or the drain contacts DR may include a silicon material doped with impurities having a second conductivity type. The bitlines BL1 through BL3 that extend in the first direction, such as the X direction of FIG. 5, are spaced apart by a particular distance in the second direction and are provided on the drains DR.

Figure 6:
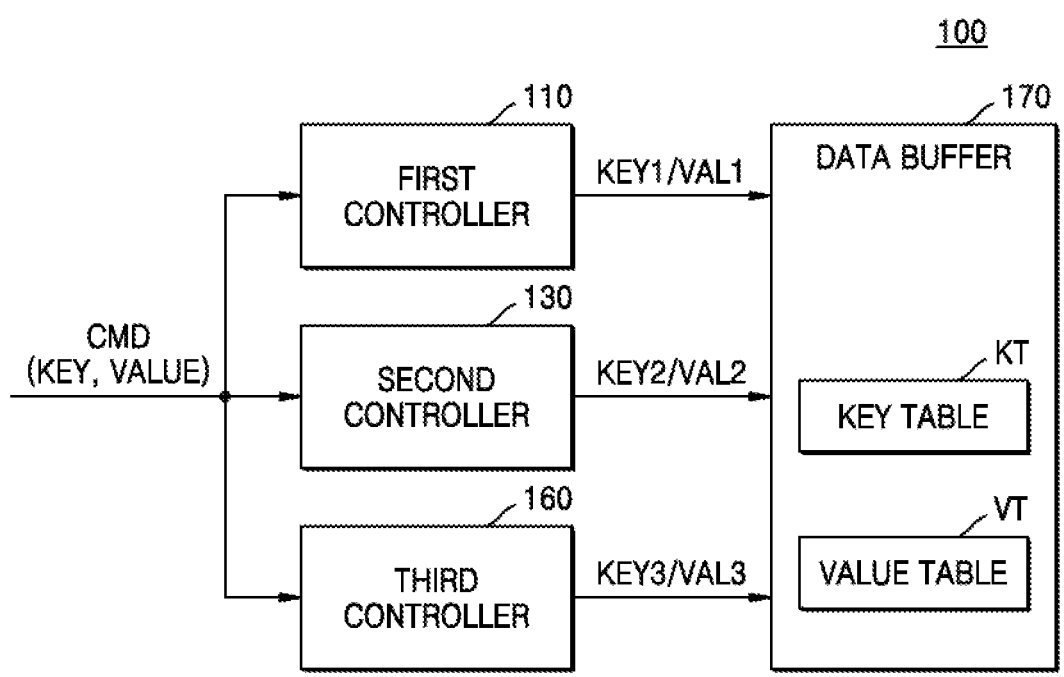
FIG. 6 is a schematic block diagram illustrating a storage device according to an exemplary embodiment.

FIG. 6 illustrates a storage device according to an exemplary embodiment. Descriptions in FIG. 6 that have already been given above with respect to FIGS. 1 and 2 will be omitted herein.

Referring to FIG. 6, a storage device 100 may include a first controller 110, a second controller 130, a third controller 160, and a data buffer 170. The storage device 100 may further include a nonvolatile memory, such as the NVM 150 of FIG. 2, connected to the data buffer 170.

The first controller 110 may receive a key-value pair included in a command CMD, and may extract from the key-value pair a plurality of first keys KEY1 and a plurality of first values VAL1 allocated to the first controller 110. The first controller 110 may store the plurality of extracted first keys KEY1 and the plurality of extracted first values VAL1 in the data buffer 170.

When the plurality of first keys KEY1 of a preset number or a preset amount of data are stored in the data buffer 170, the first controller 110 may store the plurality of stored first keys KEY1 as a first key stream, such as ST_KEY1 of FIG. 2, in the nonvolatile memory 150. When the plurality of first values VAL1 of a preset number or a preset amount of data are stored in the data buffer 170, the first controller 110 may store the plurality of stored first values VAL1 as a first value stream, such as ST_VAL1 of FIG. 2, in the nonvolatile memory 150. In an embodiment, a value stream and a key stream may be stored in different areas of the nonvolatile memory 150. In an embodiment, the first controller 110 may add, to the plurality of first keys KEY1, processing core information about a controller, such as the second controller 130 or the third controller 160, that is processing a next key, and generate the first key stream by merging the plurality of first keys KEY1 to which the processing core information is added.

In an embodiment, the first controller 110 may manage physical addresses of the first keys KEY1 stored in the data buffer 170 using a key table KT. In an embodiment, the key table KT may be generated as a hash table that stores hashed keys corresponding to the first keys KEY1 together as mapping indexes for the first keys KEY1. Also, in an embodiment, the first controller 110 may manage physical addresses of the stored first values VAL1 in the nonvolatile memory 150 using a value table VT.

In a similar manner to the first controller 110, the second controller 130 may generate a second key stream using a plurality of second keys KEY2 allocated to the second controller 130, and generate a second value stream using a plurality of second values VAL2. In a similar manner to the first controller 110, the third controller 160 may generate a third key stream using a plurality of third keys KEY3 allocated to the third controller 160, and generate a third value stream using a plurality of third values VAL3.

The data buffer 170 may include at least one memory device for storing the first, second, and third keys KEY1, KEY2, and KEY3, as well as the first, second, and third values VAL1, VAL2, and VAL3. In an embodiment, the data buffer 170 may include a volatile memory device, such as a dynamic random-access memory (DRAM) or a static random-access memory (SRAM).

The data buffer 170 may store the key table KT and the value table VT in addition to storing the first, second, and third keys KEY1, KEY2, and KEY3 as well as the first, second, and third values VAL1, VAL2, and VAL3. The key table KT may store the key stream and a physical address of the nonvolatile memory 150 in which the key stream is stored. In an embodiment, the key table KT may further include a validity bit indicating whether the key stream is valid. The value table VT may store the value stream and a physical address of the nonvolatile memory 150 in which the value stream is stored. In an embodiment, the value table VT may further include a validity bit indicating whether the value stream is valid.

According to an embodiment, a plurality of controllers, such as the first, second, and third controllers 110, 130, and 160, may perform corresponding operations in response to one command CMD. Here, the plurality of controllers, such as the first, second, and third controllers 110, 130, and 160, may respectively add, to the first, second, and third keys KEY1, KEY2, and KEY3, information about controllers processing next keys, and thus, key-value-based data processing may be efficiently performed by the plurality of controllers.

In FIG. 6, an example is illustrated in which three controllers, namely the first, second, and third controllers 110, 130, and 160, are included in the storage device 100, but this is merely an embodiment, and thus the spirit of the inventive concept may also be applied to an embodiment in which greater or fewer than three controllers are included in the storage device 100.

Figure 7:
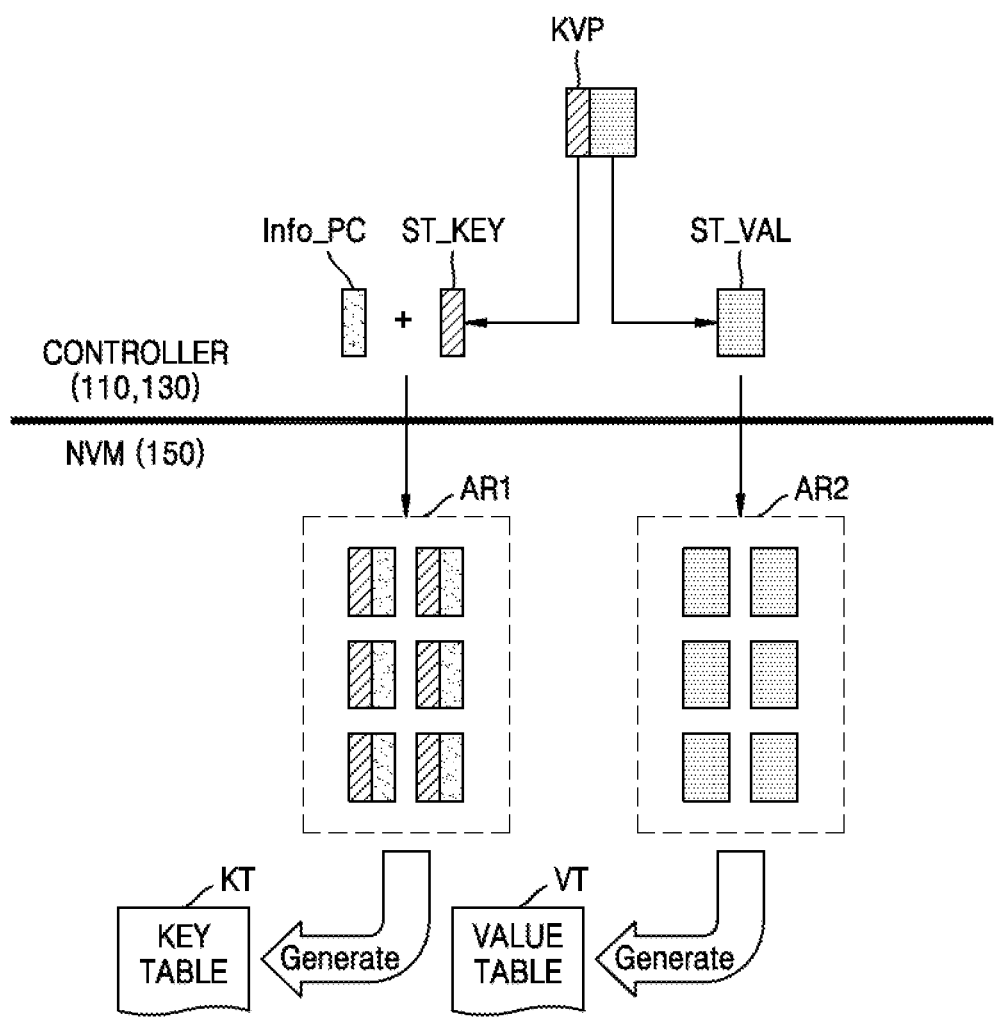
FIG. 7 is a conceptual diagram illustrating an operation of a storage device, according to an exemplary embodiment.

FIG. 7 illustrates an operation of a storage device, according to an exemplary embodiment.

Referring to FIGS. 2 and 7, as the second controller 130 performs an operation substantially the same as or similar to the first controller 110, so merely an operation of the first controller 110 may be described in FIG. 7 to avoid duplicate description. The first controller 110 may receive key-value pairs KVP, and may separate keys and values from those included in the key-value pairs KVP. The first controller 110 may combine processing core information Info_PC of a next key with each key. Also, the first controller 110 may generate a key stream ST_KEY by merging a plurality of keys with which the processing core information Info_PC is combined and store the generated key stream ST_KEY in a first area AR1 of the nonvolatile memory 150.

In FIG. 7, one key stream ST_KEY is illustrated to correspond to one piece of processing core information Info_PC, but this is for convenience of description, and thus, a key stream ST_KEY according to an embodiment may include a plurality of processing core information-key pairs in which the processing core information Info_PC is combined with each key, for example.

The first controller 110 may further combine indexes, respectively corresponding to values, with keys, generate a key stream ST_KEY by merging a plurality of keys respectively combined with the indexes and the processing core information Info_PC, and store the generated key stream ST_KEY in the first area AR1 of the nonvolatile memory 150.

The first controller 110 may store the values separated from the key-value pair KVP in a data buffer, such as the data buffer 170 of FIG. 6, generate a value stream ST_VAL by merging a plurality of values stored in the data buffer, and store the generated value stream ST_VAL in a second area AR2 of the nonvolatile memory 150.

The first controller 110 may generate a key table KT using a physical page number (PPN) where the key stream ST_KEY is stored in the nonvolatile memory 150. In other words, the key table KT may store the PPN and a physical address of the nonvolatile memory 150 in which the key stream ST_KEY is stored. In an embodiment, the key table KT may further include a validity bit indicating whether the key stream ST_KEY is valid.

The first controller 110 may generate a value table VT using a PPN where the value stream ST_VAL is stored in the nonvolatile memory 150. In other words, the value table VT may store the PPN and a physical address of the nonvolatile memory 150 in which the value stream ST_VAL is stored. In an embodiment, the value table VT may further include a validity bit indicating whether the value stream ST_VAL is valid.

FIGS. 8A through 8D illustrate key-value pairs according to an exemplary embodiment.

Referring to FIGS. 2 and 8A, first key KEY0 through ninth key KEY8 may have a sequential metadata sequence. The first controller 110 may receive the first key KEY0, the fourth key KEY3, and the seventh key KEY6 and include second processing core information C1 about the second controller 130 processing a next key, in each of the received first key KEY0, the received fourth key KEY3, and the received seventh key KEY6. Also, the second controller 130 may receive the second key KEY1, the fifth key KEY4, and the eighth key KEY7 and include third processing core information C2 about the third controller 160 processing a next key, in each of the received second key KEY1, the received fifth key KEY4, and the received eighth key KEY7. The third controller 160 may receive the third key KEY2, the sixth key KEY5, and the ninth key KEY8 and include first processing core information C0 about the first controller 110 processing a next key, in each of the received third key KEY2, the received sixth key KEY5, and the received ninth key KEY8.

Referring to FIGS. 2 and 8B, the first controller 110 may receive the first key KEY0, the fourth key KEY3, and the seventh key KEY6, include, in the received first key KEY0, the second processing core information C1 about the second controller 130 processing the second key KEY1 that is a next key, include, in the received fourth key KEY3, the third processing core information C2 about the third controller 160 processing the fifth key KEY4 that is a next key, and include, in the received seventh key KEY6, the second processing core information C1 about the second controller 130 processing the eighth key KEY7 that is a next key.

The second controller 130 may receive the second key KEY1, the sixth key KEY5, and the eighth key KEY7, include, in the received second key KEY1, the third processing core information C2 about the third controller 160 processing the third key KEY2 that is a next key, include, in the received sixth key KEY5, the first processing core information C0 about the first controller 110 processing the seventh key KEY6 that is a next key, and include, in the received eighth key KEY7, the third processing core information C2 about the third controller 160 processing the ninth key KEY8 that is a next key.

The third controller 160 may receive the third key KEY2, the fifth key KEY4, and the ninth key KEY8, include, in the received third key KEY2, the first processing core information C0 about the first controller 110 processing the fourth key KEY3 that is a next key, and include, in the received fifth key KEY4, the second processing core information C1 about the second controller 130 processing the sixth key KEY5 that is a next key. Here, the third controller need not include, in the received ninth key KEY8, the first processing core information C0 about the first controller 110 processing the next key, if there is no next key.

Referring to FIGS. 2 and 8C, FIG. 8C illustrates an embodiment in which when a next key is processed in the same controller, processing core information is not included. The first controller 110 may receive the first key KEY0, the second key KEY1, and the third key KEY2. Since a next key after the received first key KEY0 and the received second key KEY1 is also processed in the first controller 110, the first controller 110 may include the second processing core information C1 about the second controller 130, merely in the third key KEY2 wherein a next key thereof is processed in the second controller 130, not in the first controller 110.

The second controller 130 may receive the fourth key KEY3, the fifth key KEY4, and the sixth key KEY5. Since a next key after the received fourth key KEY3 and the received fifth key KEY4 is also processed in the second controller 130, the second controller 130 may include the third processing core information C2 about the third controller 160, merely in the sixth key KEY5 wherein a next key thereof is processed in the third controller 160, not in the second controller 130.

The third controller 160 may receive the seventh key KEY6, the eighth key KEY7, and the ninth key KEY8. Since a next key after the received seventh key KEY6 and the received eighth key KEY7 is also processed in the third controller 160, the third controller 160 may include the first processing core information C0 about the first controller 110, merely in the ninth key KEY8 wherein a next key thereof is processed in the first controller 110, since not in the third controller 160. Here, the next key after the ninth key KEY8 that is not shown may be processed in the first controller 110.

Referring to FIGS. 2 and 8D, FIG. 8D illustrates an embodiment in which processing core information is included in values rather than in keys. The first controller 110 may receive a first value VAL0, a fourth value VAL3, and a seventh value VAL6 and include the second processing core information C1 about the second controller 130 processing a next value, in each of the received first value VAL0, the received fourth value VAL3, and the received seventh value VAL6. Also, the second controller 130 may receive a second value VAL1, a fifth value VAL4, and an eighth value VAL7 and include the third processing core information C2 about the third controller 160 processing a next value, in each of the received second value VAL1, the received fifth value VAL4, and the received eighth value VAL7. The third controller 160 may receive a third value VAL2, a sixth value VAL5, and a ninth value VAL8 and include the first processing core information C0 about the first controller 110 processing a next value, in each of the received third value VAL2, the received sixth value VAL5, and the received ninth value VAL8.

In alternate embodiments, processing core information may be included in keys and values. For example, such an embodiment may normally use the processing information included in the keys; but if a key is invalid, the next processing information from the value may be used.

Figure 9:
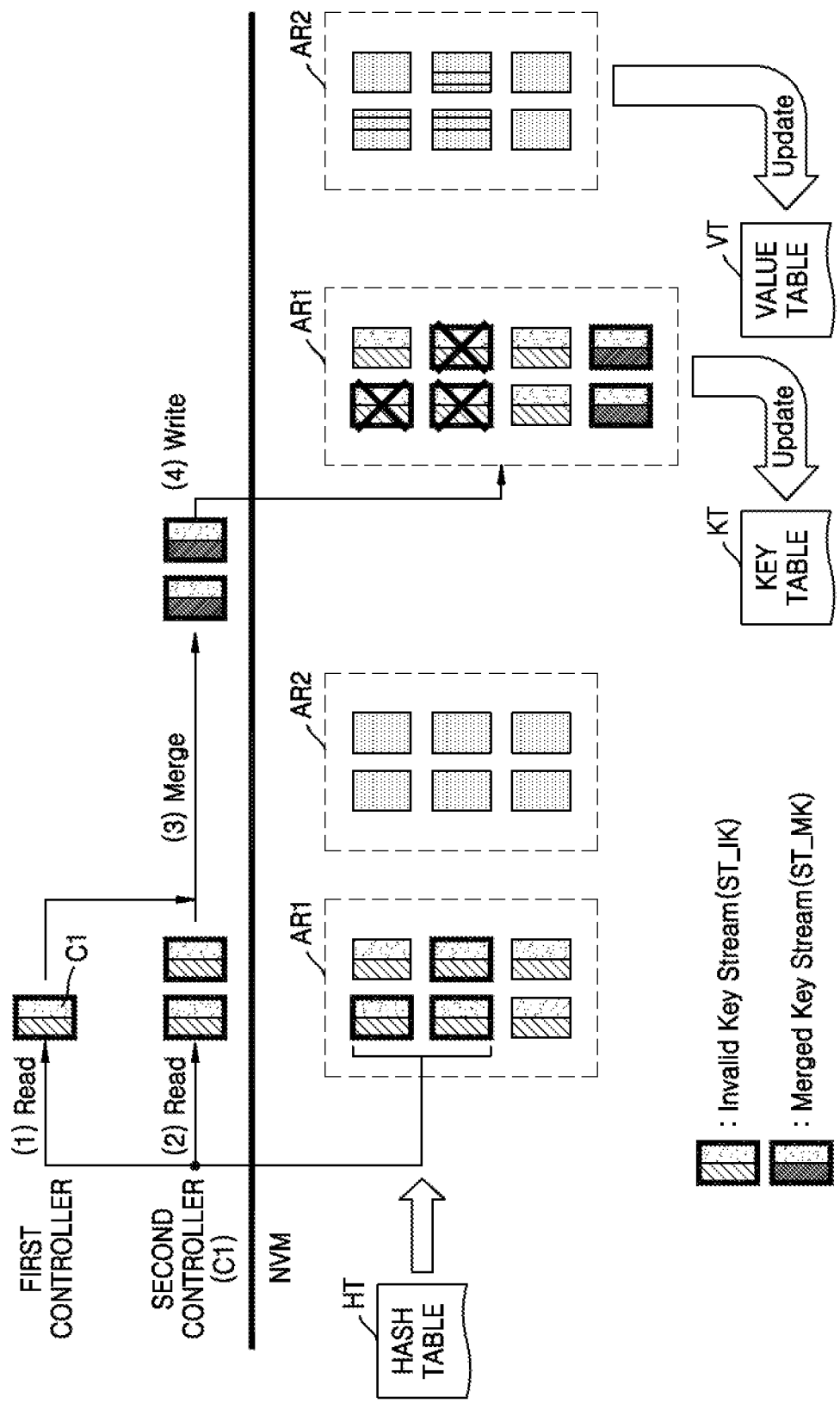
FIG. 9 is a conceptual diagram illustrating an operation of a storage device, according to an exemplary embodiment.

FIG. 9 illustrates an operation of a storage device according to an exemplary embodiment. In detail, FIG. 9 is a view illustrating a method in which a storage device performs a compaction operation.

Referring to FIGS. 2 and 9, the first controller 110 may read invalid key streams ST_IK from a first area AR1 of the nonvolatile memory 150. In an embodiment, the first controller 110 may update a hash table HT with information about whether a key included in a key stream is valid, in response to various types of commands of a host (200 of FIG. 1) and identify the invalid key stream ST_IK on the basis of the hash table HT. In an example, when receiving an erase command for a first value from the host (200 of FIG. 1), the first controller 110 may identify a first key corresponding to the first value in the hash table HT and update the hash table HT to indicate that the first key is invalid.

The first controller 110 may identify that a next key is processed in the second controller 130, using second processing core information C1 included in the identified invalid key stream ST_IK. The first controller 110 may output information related thereto to the second controller 130 to enable the second controller 130 to read next invalid key streams ST_IK. In an example, the first controller 110 may delete invalid keys included in the invalid key stream ST_IK allocated to the first controller 110 and transmit a key stream including merely valid keys to the second controller 130.

The second controller 130 may receive at least one key from the first controller 110 and merge the at least one key with the invalid key stream ST_IK allocated to the second controller 130 to generate at least one merged key stream ST_MK. In an example, the first controller 110 or the second controller 130 may delete an invalid key on the basis of the hash table HT described above and extract valid keys to generate the merged key stream ST_MK. Therefore, the merged key stream ST_MK may be a key stream including the valid keys.

The first controller 110 or the second controller 130 may write the generated merged key stream ST_MK in the first area AR1 of the nonvolatile memory 150. Also, the first key-value manager 120 may delete the invalid key stream ST_IK. In an embodiment, the first controller 110 or the second controller 130 may perform a garbage collection for invalid values on the basis of validity bits of a value table VT. As the garbage collection is performed on the basis of the value table VT, the invalid values may be deleted from a second area AR2.

The storage device 100 according to an embodiment may identify information about a next key using processing core information in a compaction operation and perform the compaction operation through a data transmission between a plurality of controllers using the same validity table and/or storage area of the NVM to enable the compaction operation to be efficiently performed even in the plurality of controllers.

Figure 10:
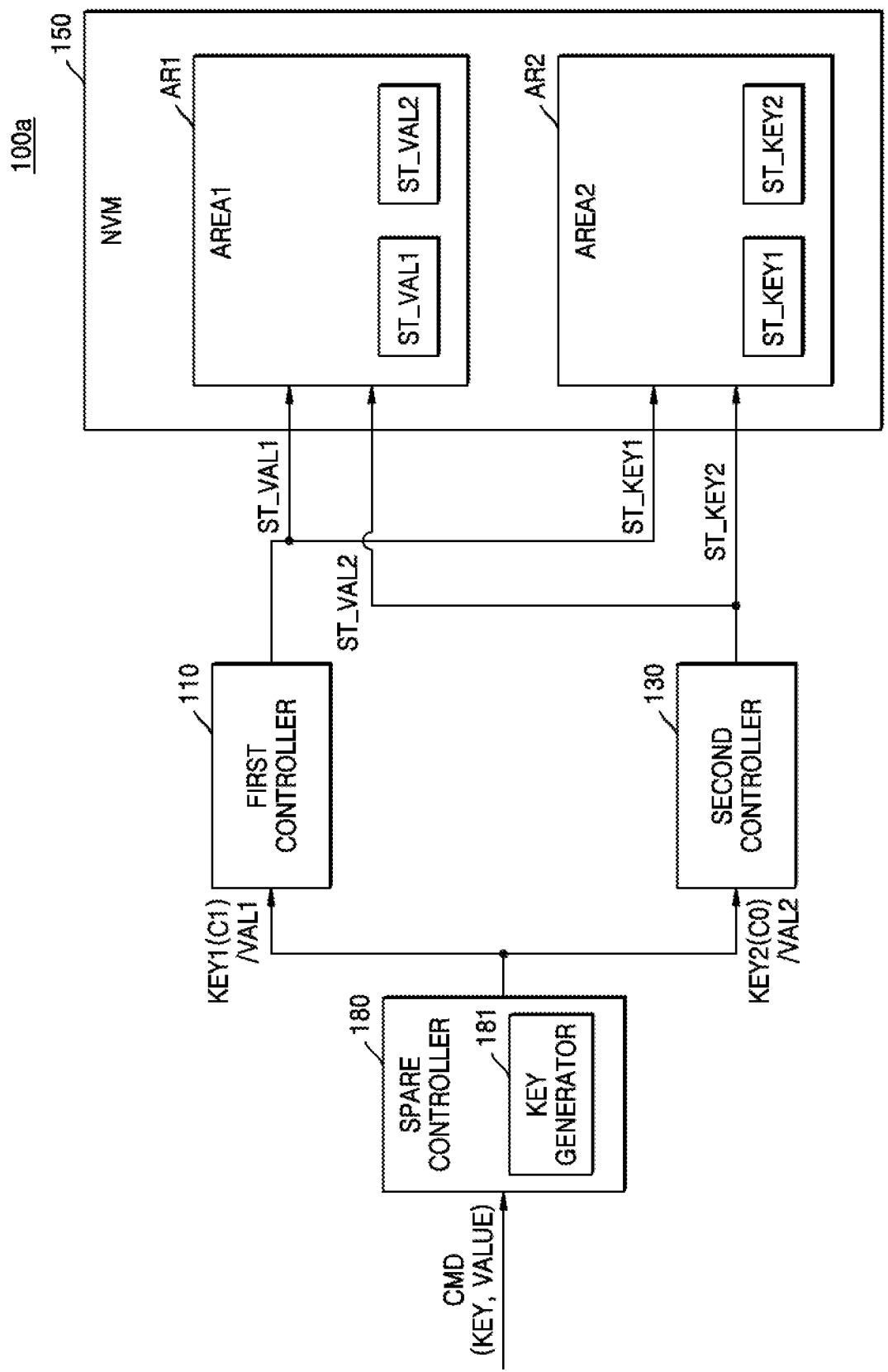
FIG. 10 is a schematic block diagram illustrating a storage device according to an exemplary embodiment.

FIG. 10 illustrates a storage device according to an exemplary embodiment. In detail, FIG. 10 illustrates an example in which processing core information is incorporated into a key by a spare controller. Descriptions in FIG. 10 that have already been substantially given above with respect to FIGS. 1 through 9 may be omitted herein.

Referring to FIG. 10, a storage device 100a may include a first controller 110, a second controller 130, a nonvolatile memory 150, and a spare controller 180. The first controller 110, the second controller 130, and the nonvolatile memory 150 may be substantially the same as described above with reference to FIG. 2, and thus description thereof may be omitted herein.

The spare controller 180 may include a key generator 181. The key generator 181 may receive a command CMD including a plurality of keys KEY and a plurality of values VALUE, and may incorporate processing core information for a next key into the plurality of keys KEY. In an example, the plurality of keys KEY may include a first key KEY1 corresponding to a first value VAL1, and a second key KEY2 corresponding to a second value VAL2. Here, a next key following the first key KEY1 may be processed in the second controller 130, and a next key following the second key KEY2 may be processed in the first controller 110.

Thus, the key generator 181 may include second processing core information C1 corresponding to the second controller 130 in the first key KEY1 and output the first key KEY1 and the first value VAL1 to the first controller 110. The key generator 181 may include first processing core information C0 corresponding to the first controller 110 in the second key KEY2 and output the second key KEY2 and the second value VAL2 to the second controller 130.

According to an embodiment, an additional controller may include processing core information in at least some of a plurality of keys KEY, and thus, key-value pair processing by a plurality of controllers, such as the first and second controllers 110 and 130, may be efficiently performed.

Figure 11:
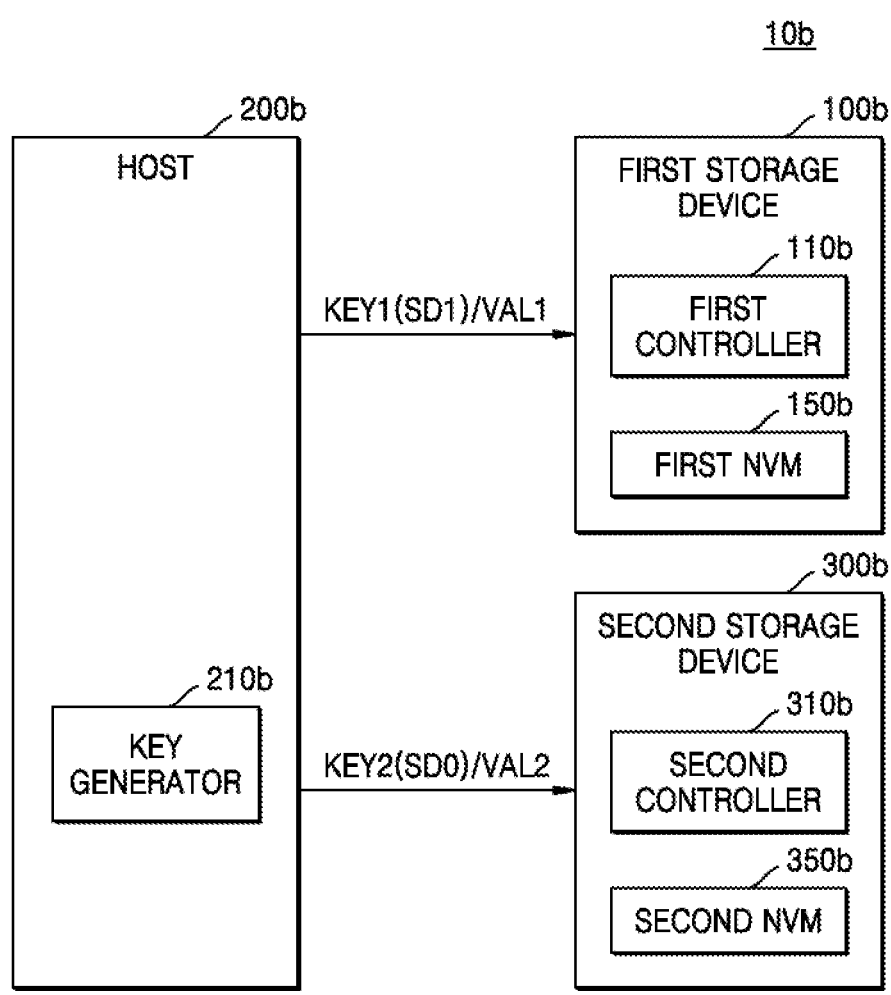
FIG. 11 is a schematic block diagram illustrating a storage system according to an exemplary embodiment.

FIG. 11 illustrates a storage system according to an exemplary embodiment. In detail, FIG. 11 illustrates an example in which processing core information is included in a key by a host. Descriptions in FIG. 11 that have already been substantially given above with reference to FIGS. 1 through 10 may be omitted herein.

Referring to FIG. 11, a storage system 10b may include a host 200b, a first storage device 100b, and a second storage device 300b. The first storage device 100b may include a first controller 110b and a first nonvolatile memory 150b, and the second storage device 300b may include a second controller 310b and a second nonvolatile memory 350b.

Each of the first controller 110b and the second controller 310b may perform an operation that is the same as or similar to that performed by the controllers described above with reference to FIGS. 1 through 10, and each of the first nonvolatile memory 150b and the second nonvolatile memory 350b may perform an operation that is the same as or similar to that performed by the nonvolatile memory described above with reference to FIGS. 1 through 10.

The host 200b may include a key generator 210b. The key generator 210b may include processing core information for a next key in a plurality of keys. In an example, the plurality of keys may include a first key KEY1 corresponding to a first value VAL1 and a second key KEY2 corresponding to a second value VAL2, a next key of the first key KEY1 may be processed in the second storage device 300b, and a next key of the second key KEY2 may be processed in the first storage device 100b.

The key generator 210b may include second processing core information SD1 corresponding to the second storage device 300b in the first key KEY1 and output the first key KEY1 and the first value VAL1 to the first storage device 100b. The key generator 210b may include first processing core information SD0 corresponding to the first storage device 100b in the second key KEY2 and output the second key KEY2 and the second value VAL2 to the second storage device 300b.

According to an embodiment, the host 200b may include processing core information in at least some of a plurality of keys KEY 1, KEY 2, and thus, key-value pair processing by a plurality of storage devices 100b and 300b may be efficiently performed.

Figure 12:
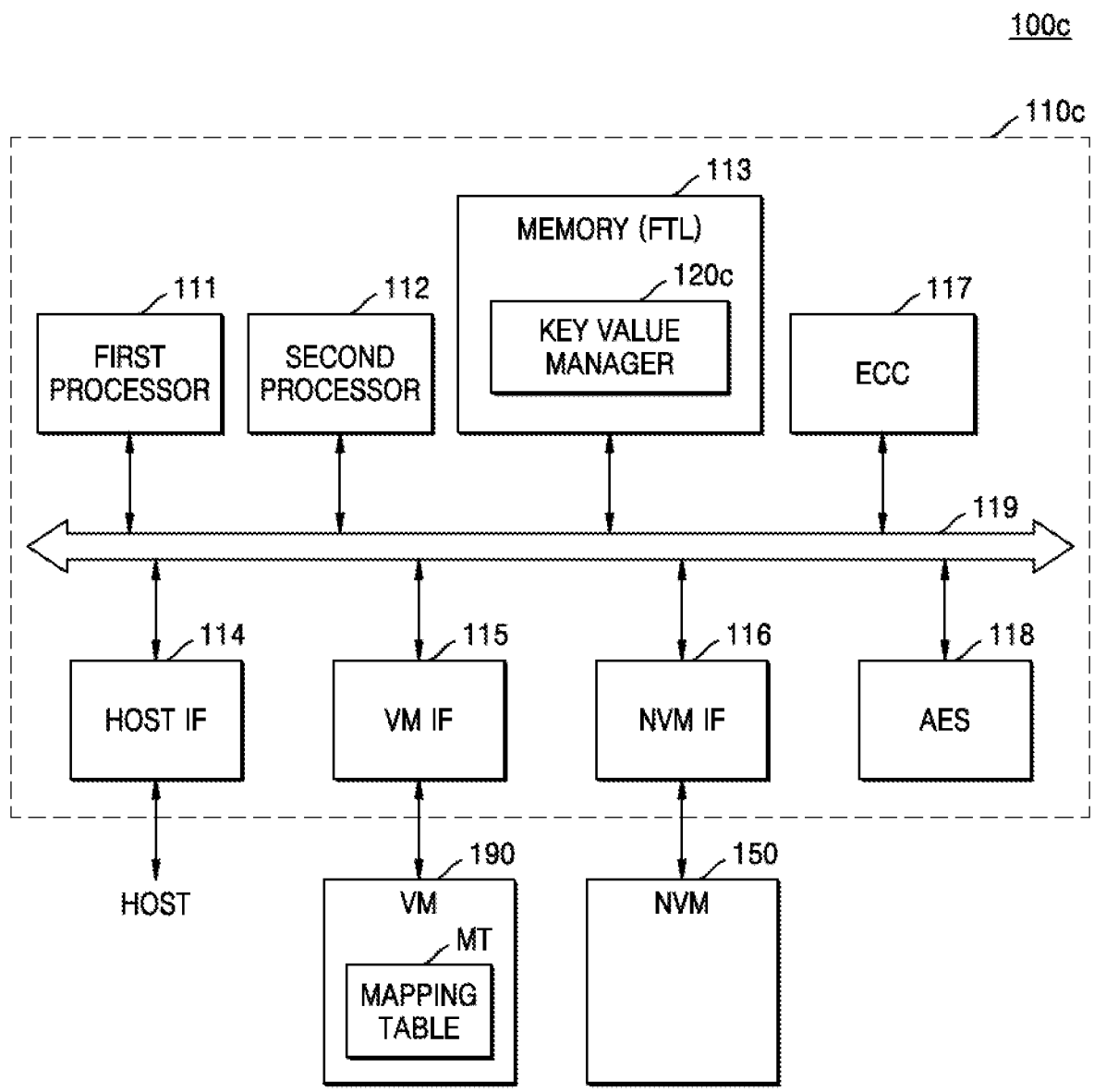
FIG. 12 is a schematic block diagram illustrating a storage device according to an exemplary embodiment.

FIG. 12 illustrates a storage device according to an exemplary embodiment.

Referring to FIG. 12, a storage device 100c may include a control circuit 110c, a volatile memory 190, and a nonvolatile memory 150. Also, the control circuit 110c may include a first processor 111, a second processor 112, a memory 113, a host interface 114, a volatile memory interface 115, a nonvolatile memory interface 116, ECC (error correction code) engine 117, and AES (advance encryption standard) engine 118 that may communicate with one another through a bus 119.

Each of the first processor 111 and the second processor 112 may include a central processing unit (CPU), a microprocessor, or the like and control an overall operation of the control circuit 110c. The memory 113 may operate under control of the first processor 111 or the second processor 112 and may be used as an operating memory, a buffer memory, a cache memory, or the like. For example, the memory 113 may also be embodied as a volatile memory such as DRAM or SRAM or a nonvolatile memory such as PRAM or flash memory including a flash translation layer (FTL). Each of the first processor 111 and the second processor 112 may operate using the memory 113 and may operate as a first controller or a second controller as described above with reference to FIGS. 1 through 11.

A key-value manager 120c may be embodied in firmware or software and may be loaded into the memory 113. In an embodiment, the key-value manger 120c may be embodied in the FTL, and may be loaded into the memory 113. However, the inventive concept is not limited thereto, and the key-value manager 120c may be embodied in hardware. The operations described above with reference to FIGS. 1 through 11 may be performed using the key-value manager 120c by the first processor 111 or the second processor 112.

The host interface 114 may provide an interface between a host HOST and the control circuit 110c. For example, the host interface 114 may provide an interface according to universal serial bus (USB), MultiMedia Card (MMC), PCI-Express (PCI-E), AT attachment (ATA), serial AT attachment (SATA), parallel AT attachment (PATA), small computer system interface (SCSI), serial attached SCSI (SAS), enhanced small disk interface (ESDI), integrated drive electronics (IDE), or the like.

The nonvolatile memory interface 116 may provide an interface between the control circuit 110c and the nonvolatile memory 150. For example, a key stream or a value stream may be transmitted and/or received between the control circuit 110c and the nonvolatile memory 150 through the nonvolatile memory interface 116. The nonvolatile memory interface 116 may be implemented to comply with standard conventions such as an asynchronous high-speed Double Date Rate (DDR) interface like Toggle NAND 2.0 and/or a high-speed Open NAND Flash Interface (ONFI) 4.2, or the like.

The volatile memory interface 116 may provide an interface between the control circuit 110c and the volatile memory 190. For example, a key, a value, and a mapping table MT may be transmitted and/or received between the control circuit 110c and the volatile memory 190.

The ECC engine 117 may perform an error detection and correction function for read data read from the nonvolatile memory 150. Specifically, the ECC engine 117 may generate parity bits for write data to be written to the nonvolatile memory 150, and the parity bits generated as described above are stored together with the write data. When reading data from the nonvolatile memory 150, the ECC engine 117 may correct the error of the read data using parity bits read from the nonvolatile memory 150 together with the read data, and output the read data in which errors are corrected. In one embodiment, the ECC engine 117 may include an ECC encoder (not shown) that generates parity bits for write data and/or an ECC decoder (not shown) that corrects errors in read data.

The AES engine 118 may perform at least one of an encryption operation and a decryption operation for data input to the controller 110c. In an embodiment, the AES engine 118 may perform at least one of an encryption operation and a decryption operation using a symmetric-key algorithm. In one embodiment, the AES engine 118 may include an encryption module (not shown) that performs an encryption operation and/or a decryption module (not shown) that performs a decryption operation.

Each of the ECC engine 117 and the AES engine 118 may be implemented as firmware or software, and may be loaded into the memory 113. However, the present disclosure is not limited thereto, and each of the ECC engine 117 and the AES engine 118 may be implemented as hardware, or may be implemented as a combination of software and hardware The volatile memory 190 may store the mapping table MT. In an example, as in the data buffer 170 of FIG. 6, the volatile memory 190 may further store a key and a value. For this, the volatile memory 190 may be embodied as DRAM. The mapping table MT may include any one of a hash table, a key table, and a value table as described above with reference to FIGS. 1 through 11.

The storage device 100c according to an embodiment may include processing core information for a next key within a key when key-value data is processed by a plurality of processors, such as the first and second processors 111 and 112, and thus, key-value data processing may be efficiently performed.

Figure 13:
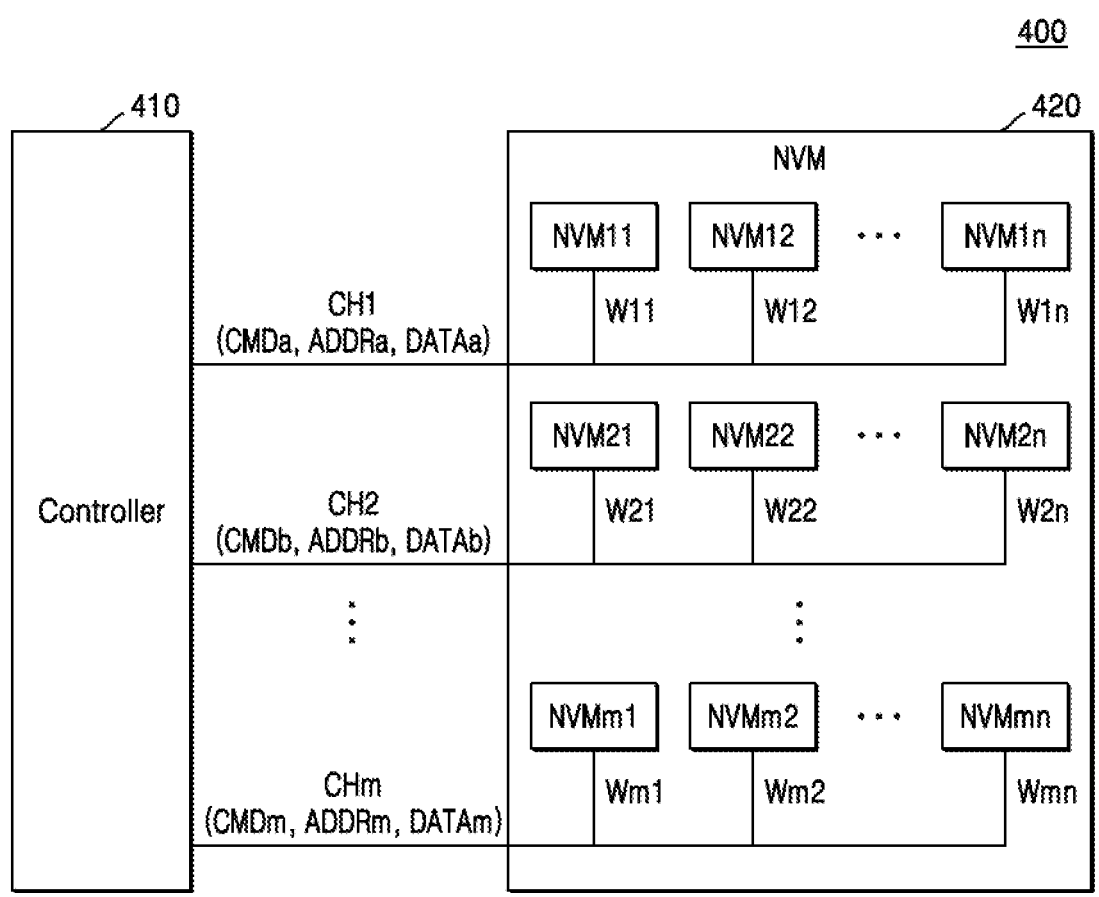
FIG. 13 is a block diagram illustrating a storage device according to an exemplary embodiment.

FIG. 13 is a block diagram illustrating a storage device according to an embodiment.

Referring to FIGS. 12 and 13, the storage device 400 may include a controller 410 and a nonvolatile memory 420. The storage device 400 may support a plurality of channels CH1 to CHm, and the controller 410 and the nonvolatile memory 420 may be connected through a plurality of channels CH1 to CHm. The controller 410 may correspond to the controllers 110, 130, 160, 110b, 130b and 110c described above in FIGS. 1 to 12, and the nonvolatile memory 420 may correspond to the nonvolatile memory 150, 150b, 350b described above in FIGS. 1 to 12.

The nonvolatile memory 420 may include a plurality of nonvolatile memory devices NVM11 to NVMmn. Each of the nonvolatile memory devices NVM11 to NVMmn may be connected to one of the plurality of channels CH1 to CHm through a corresponding way. For example, the nonvolatile memory devices NVM11 to NVM1n are connected to the first channel CH1 through the ways W11 to W1n, and the nonvolatile memory devices NVM21 to NVM2n are connected to the second channel CH2 through the ways W21 to W2n.

The controller 410 may transmit and receive signals to and from the nonvolatile memory 420 through a plurality of channels CH1 to CHm. For example, the controller 410 transmits commands CMDa to CMDm, addresses ADDRa to ADDRm, and data DATAa to DATAm to the nonvolatile memory 420 through channels CH1 to CHm. Alternatively, data DATAa to DATAm may be received from the nonvolatile memory 420.

The controller 410 may select one of the nonvolatile memory devices connected to the corresponding channel through each channel, and transmit and receive signals with the selected nonvolatile memory device. For example, the controller 410 may select the nonvolatile memory device NVM11 from among the nonvolatile memory devices NVM11 to NVM1n connected to the first channel CH1. The controller 410 transmits a command CMDa, an address ADDRa, and data DATAa to the selected nonvolatile memory device NVM11 through the way W11, or receive data DATAa from the selected nonvolatile memory device NVM11 through the way W11.

Figure 14:
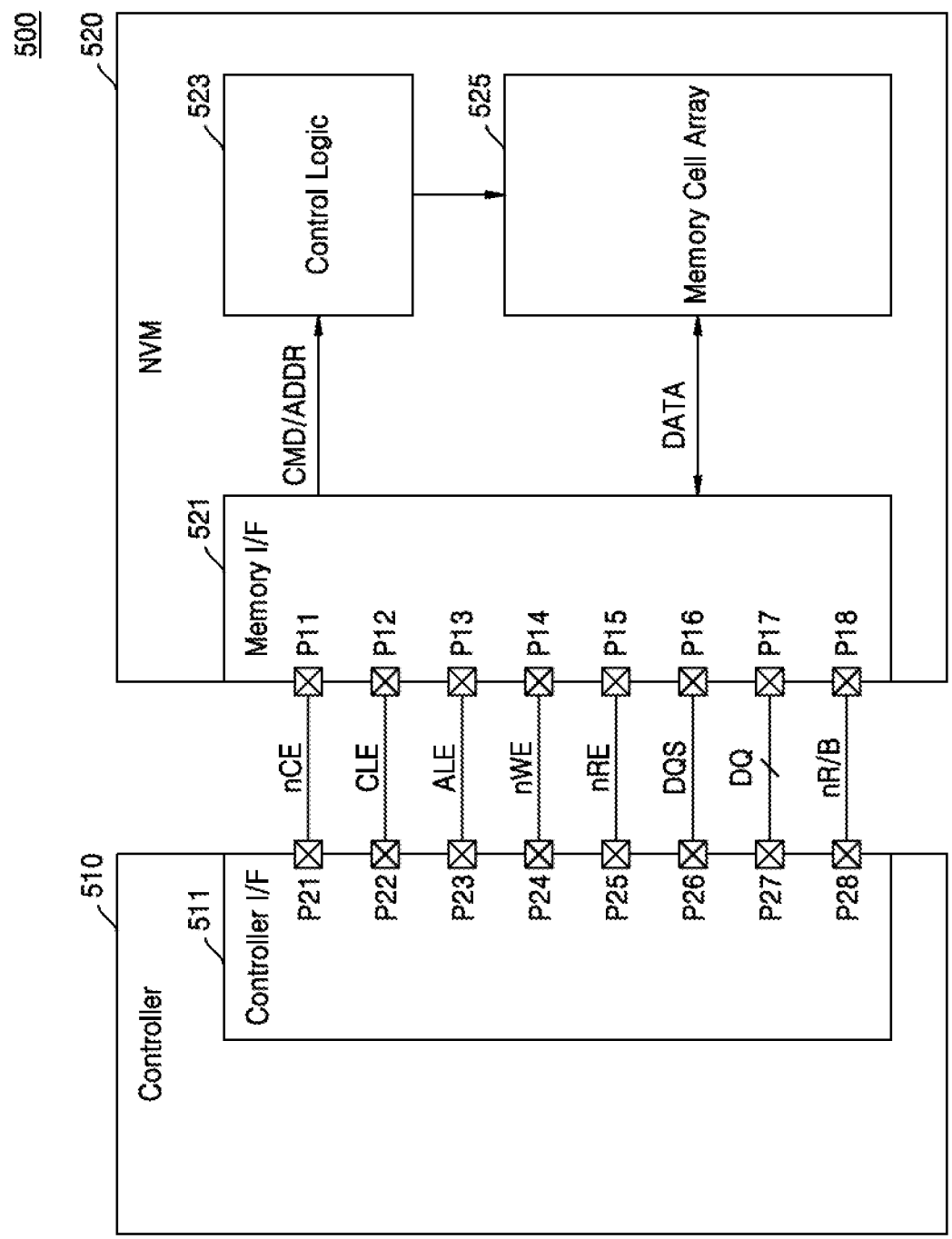
FIG. 14 is a block diagram illustrating a storage device according to an exemplary embodiment.

FIG. 14 is a block diagram illustrating a storage device according to an embodiment.

Referring to FIGS. 13 and 14, the storage device 500 may include a controller 510 and a nonvolatile memory 520. The nonvolatile memory 520 may correspond to one of the nonvolatile memory devices NVM11 to NVMmn communicating with the controller 410 based on one of the plurality of channels CH1 to CHm of FIG. 13. The controller 510 may correspond to the controller 410 of FIG. 13.

The controller 510 may include first to eighth pins P21 to P28 and a controller interface circuit 511. The nonvolatile memory 520 may include first to eighth pins P11 to P18, a memory interface circuit 521, a control logic circuit 523, and a memory cell array 525. The first to eighth pins P21 to P28 may correspond to the first to eighth pins P11 to P18.

The controller interface circuit 511 may transmit the chip enable signal nCE to the nonvolatile memory 520 through the first pin P21. The controller interface circuit 511 may transmit and receive signals to and from the nonvolatile memory 520 selected through the chip enable signal nCE through the second to eighth pins P22 to P28.

The controller interface circuit 511 transmits a command latch enable signal CLE, an address latch enable signal ALE, and a write enable signal nWE through the second to fourth pins P22 to P24 to a nonvolatile memory 520. The controller interface circuit 511 may transmit the read enable signal nRE to the nonvolatile memory 520 through the fifth pin P25. The controller interface circuit 511 may receive the data strobe signal DQS from the nonvolatile memory 520 through the sixth pin P26 or transmit the data strobe signal DQS to the nonvolatile memory 520 through the sixth pin P26.

The controller interface circuit 511 may transmit or receive the data signal DQ to and from the nonvolatile memory 520 through the seventh pin P27. The command CMD, the address ADDR, and the data DATA may be transmitted through the data signal DQ. For example, the data signal DQ may be transmitted through a plurality of data signal lines. In this case, the seventh pin P17 may include a plurality of pins corresponding to a plurality of data signals. The memory interface circuit 521 may transmit the ready/busy output signal nR/B to the controller 510 through the eighth pin P28.

The control logic circuit 523 may generally control various operations of the nonvolatile memory 520. The control logic circuit 523 may receive the command/address CMD/ADDR obtained from the memory interface circuit 521. The control logic circuit 523 may generate various control signals for programming data DATA into the memory cell array 525 or reading data DATA from the memory cell array 525 according to the received command/address CMD/ADDR.

Figure 15:
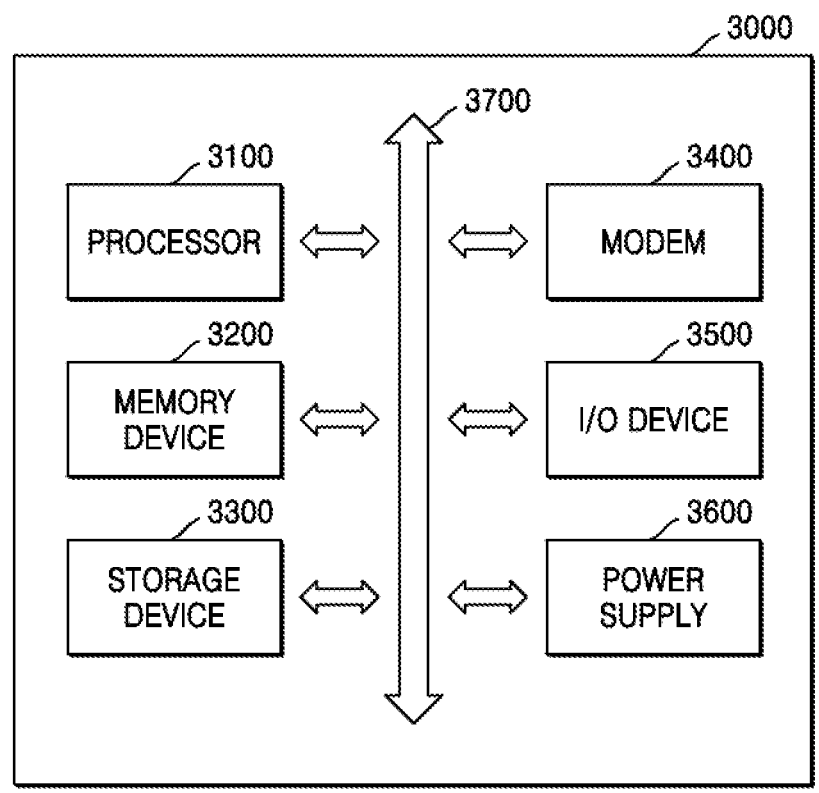
FIG. 15 is a schematic block diagram illustrating an electronic device according to an exemplary embodiment.

FIG. 15 illustrates an electronic device according to an exemplary embodiment.

Referring to FIG. 15, an electronic device 3000 may include a processor 3100, a memory device 3200, a storage device 3300, a modem 3400, an input/output device 3500, and a power supply 3600. In an embodiment, the storage device 3300 may be embodied using the embodiments described above with reference to FIGS. 1 through 14.

In an embodiment, the storage device 3300 may receive, from a host, key-value pairs including a plurality of keys, and a plurality of values respectively corresponding to the plurality of keys, and separate the plurality of keys and the plurality of values from the key-value pairs.

In an embodiment, the storage device 3300 may combine processing core information for a next key with each of the plurality of keys and merge the plurality of keys with which the processing core information is combined to generate a key stream. Also, the storage device 3300 may merge the plurality of values to generate a value stream. In addition, the storage device 3300 may store the generated key stream and the generated value stream in an internal or external nonvolatile memory device.

In an embodiment, the storage device 3300 may delete an invalid key from a plurality of controllers using processing core information in a compaction process and generate a key stream including valid keys. Therefore, key-value data processing may be efficiently performed in the compaction process of the storage device 3300 having a multi-core processing system.

While the inventive concept has been particularly shown and described with reference to exemplary embodiments thereof, it will be understood that various changes in form and details may be made therein by those of ordinary skill in the pertinent art without departing from the scope and sprit of the inventive concept as defined by the following claims.

What is claimed is:

1. A storage device comprising:
a first controller assigned to process a first key-value pair including a first key and a first value corresponding to the first key;
a second controller assigned to process a second key-value pair including a second key and a second value corresponding to the second key; and
a nonvolatile memory configured to store the first key, the second key, the first value, and the second value,
wherein information indicates whether a controller, assigned for processing a next key-value pair after processing at least one of the first key-value pair or the second key-value pair, is the second controller or the first controller,
wherein the information is included in the at least one of the first key-value pair or the second key-value pair.

2. The storage device of claim 1, wherein:
the storage device is configured to separate and manage a plurality of keys and a plurality of values respectively corresponding to the plurality of keys,
the first controller includes, in the first key, a first index corresponding to the first value and first processing core information corresponding to the second controller and merges the first key with at least one third key processed by the first controller to generate a first key stream, and
the second controller includes a second index corresponding to the second value in the second key and merges the second key with at least one fourth key processed by the second controller to generate a second key stream.

3. The storage device of claim 2, wherein:
the nonvolatile memory comprises a first block and a second block,
the first controller stores the first key stream in the first block, and
the second controller stores the second key stream in the second block.

4. The storage device of claim 3, wherein:
the first controller reads the first key stream from the first block and outputs the first key stream to the second controller based on the first processing core information included in the first key stream, and
the second controller performs a compaction operation of reading the second key stream from the second block and merging the second key stream with the first key stream received from the first controller to generate a third key stream.

5. The storage device of claim 4, wherein:
the second controller generates the third key stream by merging valid keys of a plurality of keys included in the first key stream and the second key stream, the valid keys correspond to values of the plurality of values not receiving an erase command from a host.

6. The storage device of claim 2, wherein:
the first controller merges a plurality of first values corresponding to the first key and the at least one third key to generate a first value stream and stores the generated first value stream in the nonvolatile memory, and
the second controller merges a plurality of second values corresponding to the second key and the at least one fourth key to generate a second value stream and stores the generated second value stream in the nonvolatile memory,
the first value stream is stored in the nonvolatile memory independently of the first key stream, and the second value stream is stored in the nonvolatile memory independently of the second key stream.

7. The storage device of claim 6, further comprising a volatile memory configured to store a key table comprising physical addresses of the first key stream and the second key stream for the nonvolatile memory and a value table comprising physical addresses of the first value stream and the second value stream for the nonvolatile memory.

8. The storage device of claim 2, wherein:
at least one fourth value processed next to at least one third value corresponding to the at least one third key is processed by the second controller, and
the first controller includes the first processing core information in both the first key and the at least one third key.

9. The storage device of claim 1, further comprising a third controller configured to process a fifth key and a fifth value corresponding to the fifth key,
wherein the second controller includes, in the second key, information about the second controller processing the fifth value processed next to the second value as second processing core information.

10. The storage device of claim 1, further comprising a spare controller configured to include, in the first key, first processing core information corresponding to the second controller processing the second value processed next to the first value.

11. The storage device of claim 1,
wherein the nonvolatile memory is configured to store the first value and the second value in at least one first area of the nonvolatile memory, and to store the first key and the second key in at least one second area of the nonvolatile memory,
wherein the first controller receives the first key to which first processing core information is added corresponding to the second controller processing the second value processed next to the first value.

12. An operating method of a storage system, comprising:
receiving data;
extracting a first key-value pair including a first key and a first value corresponding to the first key from the received data;
extracting a second key-value pair including a second key and a second value corresponding to the second key from the received data;
generating first processing core information indicating a processing core for processing a key-value pair after processing at least one of the first key-value pair or the second key-value pair, wherein the first processing core information is included in the at least one of the first key-value pair or the second key-value pair; and storing the at least one of the first key-value pair or the second key-value pair including the first processing core information in a nonvolatile memory.

13. The operating method of claim 12, wherein:
the storage system comprises a storage device comprising a first controller and a second controller,
the extracting of the first value is performed by the first controller, and
the extracting of the second value is performed by the second controller.

14. The operating method of claim 13, wherein the first processing core information comprises information about the second controller.

15. The operating method of claim 13, wherein:
the storage device comprises a spare controller, and
the including of the first processing core information is performed by the spare controller.

16. The operating method of claim 12, wherein:
the storage system comprises a first storage device and a second storage device,
the extracting of the first value is performed by the first storage device, the extracting of the second value is performed by the second storage device, and
the first processing core information comprises information about the second storage device.

17. The operating method of claim 12, wherein:
the storage system comprises a host and at least one storage device, and
the including of the first processing core information is performed by the host.

18. A storage system comprising:
a host configured to transmit data comprising a plurality of key-value pairs including a plurality of keys and a plurality of values corresponding to the plurality of keys, respectively;
a first storage device configured to process a first key-value pair including a first key of the plurality of keys and a first value corresponding to the first key; and
a second storage device configured to process a second key-value pair including a second key of the plurality of keys and a second value corresponding to the second key,
wherein at least one of the first key-value pair or the second key-value pair includes information indicative of whether a storage device, assigned for processing a next key-value pair after processing the at least one of the first key-value pair or the second key-value pair, is the second storage device or the first storage device.

19. The storage system of claim 18,
wherein the information is related to a processing core,
wherein the host includes, in the first key, first processing core information about a processing core for the second value processed next to the first value and transmits the first key including the first processing core information to the first storage device.

20. The storage system of claim 18, wherein:
the first storage device and the second storage device comprise a first area and a second area, respectively, of a same non-volatile memory device,
the first area includes the first value and the second value,
the second area includes the first key and the second key.

* * * * *